United States Patent
Singh et al.

(10) Patent No.: US 9,728,284 B2
(45) Date of Patent: Aug. 8, 2017

(54) APPARATUS FOR SUPPORTING RADIOACTIVE FUEL ASSEMBLIES AND METHODS OF MANUFACTURING THE SAME

(71) Applicant: Holtec International, Inc., Marlton, NJ (US)

(72) Inventors: Krishna P. Singh, Hobe Sound, FL (US); Stephen J. Agace, Marlton, NJ (US)

(73) Assignee: HOLTEC INTERNATIONAL, INC.

( * ) Notice: Subject to any disclaimer, the term of this patent is extended or adjusted under 35 U.S.C. 154(b) by 1037 days.

(21) Appl. No.: 14/072,672

(22) Filed: Nov. 5, 2013

(65) Prior Publication Data

US 2014/0105347 A1    Apr. 17, 2014

Related U.S. Application Data

(63) Continuation of application No. 12/260,914, filed on Oct. 29, 2008, now Pat. No. 8,576,976.

(60) Provisional application No. 61/038,525, filed on Mar. 21, 2008, provisional application No. 60/983,566, filed on Oct. 29, 2007.

(51) Int. Cl.
    *G21C 19/07*    (2006.01)
    *G21F 5/012*    (2006.01)

(52) U.S. Cl.
    CPC ............ *G21C 19/07* (2013.01); *G21F 5/012* (2013.01)

(58) Field of Classification Search
    USPC ........................................................ 376/272
    See application file for complete search history.

(56) References Cited

U.S. PATENT DOCUMENTS

| | | | |
|---|---|---|---|
| 1,415,274 A | 5/1922 | Stowell | |
| 2,426,943 A | 9/1947 | Morden | |
| 2,968,734 A | 1/1961 | Yeomans | |
| 3,844,886 A | 10/1974 | Crowther | |
| 4,039,842 A | 8/1977 | Mollon | |
| 4,084,363 A | 4/1978 | Moore | |
| 4,096,392 A * | 6/1978 | Rubinstein | G21C 19/40 376/272 |
| 4,124,445 A | 11/1978 | Mollon | |
| 4,218,622 A | 8/1980 | McMurtry et al. | |
| 4,225,467 A | 9/1980 | McMurtry et al. | |

(Continued)

FOREIGN PATENT DOCUMENTS

| | | |
|---|---|---|
| DE | 3216855 | 11/1983 |
| EP | 0626699 | 11/1994 |

(Continued)

OTHER PUBLICATIONS http://www.easyrenovate.com/why-stagger-end-joints-subflooring/, accessed Jul. 4, 2011.

(Continued)

*Primary Examiner* — Sean P Burke
(74) *Attorney, Agent, or Firm* — The Belles Group, P.C.

(57) ABSTRACT

An apparatus for supporting radioactive fuel assemblies, such as spent nuclear fuel. In one aspect, the invention is an apparatus, which can be in the form of a fuel basket, fuel rack, or the like, in which polygonal storage tubes are used not only for their internal cells but are also strategically patterned to create resultant cells with their outside surfaces.

11 Claims, 24 Drawing Sheets

(56) References Cited

U.S. PATENT DOCUMENTS

| | | |
|---|---|---|
| 4,287,145 A | 9/1981 | McMurtry et al. |
| 4,382,060 A | 5/1983 | Holtz et al. |
| 4,581,201 A | 4/1986 | Haggstrom et al. |
| 4,610,893 A | 9/1986 | Eriksson et al. |
| 4,626,402 A | 12/1986 | Baatz et al. |
| 4,634,875 A | 1/1987 | Kugeler et al. |
| 4,666,659 A | 5/1987 | Lusk et al. |
| 4,788,029 A | 11/1988 | Kerjean |
| 4,988,473 A | 1/1991 | Mueller et al. |
| 4,997,618 A | 3/1991 | Efferding |
| 5,009,837 A | 4/1991 | Nguyen et al. |
| 5,019,327 A | 5/1991 | Fanning et al. |
| 5,032,348 A | 7/1991 | Blum et al. |
| 5,063,299 A | 11/1991 | Efferding |
| 5,198,183 A | 3/1993 | Newman |
| 5,232,657 A | 8/1993 | Kovacik et al. |
| 5,245,641 A | 9/1993 | Machado et al. |
| 5,291,532 A | 3/1994 | Townsend et al. |
| 5,361,281 A | 11/1994 | Porowski |
| 5,365,556 A | 11/1994 | Mallie |
| 5,431,295 A | 7/1995 | Meess |
| 5,438,597 A | 8/1995 | Lehnert et al. |
| 5,479,463 A | 12/1995 | Roberts |
| 5,629,964 A | 5/1997 | Roberts |
| 5,651,038 A | 7/1997 | Chechelnitsky et al. |
| 5,715,289 A | 2/1998 | Kirchner et al. |
| 5,841,825 A | 11/1998 | Roberts |
| 5,887,042 A | 3/1999 | Akamatsu et al. |
| 5,898,747 A | 4/1999 | Singh |
| 5,914,994 A | 6/1999 | Wasinger et al. |
| 5,965,829 A | 10/1999 | Haynes et al. |
| 6,042,779 A | 3/2000 | Oschmann et al. |
| 6,064,710 A | 5/2000 | Singh |
| 6,283,028 B1 | 9/2001 | Walczak |
| 6,327,321 B1 | 12/2001 | Holman |
| 6,442,227 B1 | 8/2002 | Iacovino, Jr. et al. |
| 6,639,395 B2 | 10/2003 | Male |
| 6,665,365 B2 | 12/2003 | Dallongeville et al. |
| 6,741,669 B2 | 5/2004 | Lindquist |
| 6,839,395 B2 | 1/2005 | Ohsono et al. |
| 6,878,952 B1 | 4/2005 | Ohsono et al. |
| 6,989,543 B2 | 1/2006 | Drobnik et al. |
| 7,194,060 B2 | 3/2007 | Ohsono et al. |
| 8,576,976 B2 * | 11/2013 | Singh .................. G21C 19/07 250/506.1 |
| 8,630,384 B2 † | 1/2014 | Carver |
| 2002/0118786 A1 | 8/2002 | Ohsono et al. |
| 2002/0163989 A1 | 11/2002 | Dallongeville et al. |
| 2003/0140471 A1 | 7/2003 | Busnardo et al. |
| 2003/0179846 A1 | 9/2003 | Murakami et al. |
| 2004/0062338 A1 | 4/2004 | Ohsono et al. |
| 2004/0140307 A1 | 7/2004 | Canzler et al. |
| 2005/0117687 A1 * | 6/2005 | Carver .................. G21C 19/07 376/272 |
| 2005/0117688 A1 | 6/2005 | Ohsono et al. |
| 2005/0135541 A1 | 6/2005 | Ohsono et al. |
| 2005/0157833 A1 | 7/2005 | Ishihara et al. |
| 2005/0188523 A1 | 9/2005 | Busnardo et al. |
| 2005/0224729 A1 | 10/2005 | Tamaki |
| 2005/0286674 A1 | 12/2005 | Fischer et al. |
| 2006/0109945 A1 | 5/2006 | Ohsono et al. |
| 2007/0034541 A1 | 2/2007 | Danko et al. |
| 2007/0133734 A1 | 6/2007 | Fawcett et al. |
| 2007/0153965 A1 | 7/2007 | Choi et al. |
| 2008/0031396 A1 | 2/2008 | Singh et al. |
| 2008/0031397 A1 | 2/2008 | Singh et al. |
| 2008/0049886 A1 | 2/2008 | Lahille et al. |
| 2008/0069291 A1 | 3/2008 | Singh et al. |
| 2009/0172961 A1 | 7/2009 | Lahille |
| 2009/0175404 A1 | 7/2009 | Singh et al. |
| 2009/0185652 A1 | 7/2009 | Tamaki et al. |
| 2011/0033019 A1 | 2/2011 | Rosenbaum et al. |
| 2011/0038449 A1 | 2/2011 | Shin et al. |
| 2011/0122985 A1 | 5/2011 | Tamaki |

FOREIGN PATENT DOCUMENTS

| | | |
|---|---|---|
| JP | 01237499 | 9/1989 |
| JP | 0712985 | 1/1995 |
| WO | 2008063708 | 5/2008 |

OTHER PUBLICATIONS

A. Machiels, Qualification of Metamic for Spent-Fuel Storage Application, EPRI Final Report Oct. 2001.

What is Metamic web article, http://www.metamic.com/whatismetamic.htm, copyright 2004. Metamic, LLC.

S.M. Barinov et al., Crack Resistance of Cermets Aluminum Oxide-Chromium, Institute of Metallurgy, Academy of Sciences of the USSR, No. 5 (341), pp. 98-101, May 1991.

\* cited by examiner
† cited by third party

APPARATUS FOR SUPPORTING RADIOACTIVE FUEL ASSEMBLIES AND METHODS OF MANUFACTURING THE SAME

CROSS-REFERENCE TO RELATED PATENT APPLICATIONS

Priority is claimed as a continuation application to U.S. patent application Ser. No. 12/260,914, filed Oct. 29, 2008 and now issued as U.S. Pat. No. 8,576,976, which claims priority to U.S. Provisional Patent Application Ser. No. 60/983,566, filed Oct. 29, 2007 and to U.S. Provisional Patent Application Ser. No. 61/038,525, filed Mar. 21, 2008. The aforementioned priority applications are incorporated herein by reference in their entireties.

FIELD OF THE INVENTION

The present invention relates generally to apparatus and methods for supporting high level radioactive waste, and specifically to apparatus and methods for supporting radioactive fuel assemblies. The subject inventions can be implemented into a wide variety of structures for transferring, supporting and/or storing spent nuclear fuel assemblies, including without limitation underwater fuel racks and fuel baskets incorporated into either canisters or casks.

BACKGROUND OF THE INVENTION

In the nuclear power industry, the nuclear energy source is in the form of hollow zircaloy tubes filled with enriched uranium, known as fuel assemblies. Upon being deleted to a certain level, spent fuel assemblies are removed from a reactor. At this time, the fuel assemblies not only emit extremely dangerous levels of neutrons and gamma photons (i.e., neutron and gamma radiation) but also produce considerable amounts of heat that must be dissipated.

It is necessary that the neutron and gamma radiation emitted from the spent fuel assemblies be adequately contained at all times upon being removed from the reactor. It is also necessary that the spent fuel assemblies be cooled. Because water is an excellent radiation absorber, spent fuel assemblies are typically submerged under water in a pool promptly after being removed from the reactor. The pool water also serves to cool the spent fuel assemblies by drawing the heat load away from the fuel assemblies. The water may also contain a dissolved neutron shielding substance.

The submerged fuel assemblies are typically supported in the fuel pools in a generally upright orientation in rack structures, commonly referred to as fuel racks. It is well known that neutronic interaction between fuel assemblies increases when the distance between the fuel assemblies is reduced. Thus, in order to avoid criticality (or the danger thereof) that can result from the mutual inter-reaction of adjacent fuel assemblies in the racks, it is necessary that the fuel racks support the fuel assemblies in a spaced manner that allows sufficient neutron absorbing material to exist between adjacent fuel assemblies. The neutron absorbing material can be the pool water, a structure containing a neutron absorbing material, or combinations thereof.

Fuel racks for high density storage of fuel assemblies are commonly of cellular construction with neutron absorbing plate structures (i.e., shields) placed between the cells in the form of solid sheets. The cells are usually long vertical square tubes which are open at the top through which the fuel elements are inserted. The cells are sometimes with double walls that encapsulate the neutron shield sheets to protect the neutron shield from corrosion or other deterioration resulting from contact with water.

Each fuel assembly is placed in a separate cell so that the fuel assemblies are shielded from one another. An example of a typical existing fuel rack, is described in U.S. Pat. No. 4,382,060, to Maurice Holtz et al., issued May 3, 1983, the entirety of which is hereby incorporated by reference. The Holtz rack is comprised of structural elements including elements which are hollow and cruciform in section. Each leg of the cruciform structural element includes a neutron shield therein. The free end of the legs of the cruciform structural element converge so as to have an included angle of approximately 90 degrees. The rack is comprised of such cruciform elements as well as cooperating elements which are generally T and L shaped in section.

In certain regions of the world, the fuel assemblies used in the nuclear reactors do not have a rectangular horizontal cross-section. Instead, the fuel assemblies have a horizontal cross-section that is generally hexagonal. In such instances, existing racks having cells with rectangular horizontal cross-sections are less than optimal.

Even after removal from the pool, the fuel assemblies still emit extremely dangerous neutrons (i.e., neutron radiation) and gamma photons (i.e., gamma radiation) and it is thus still imperative that these neutrons and gamma photons be contained at all times during transfer and storage. It also imperative that the residual heat emanating from the fuel assemblies be lead away and escape from the fuel assemblies. Thus, containers used to transfer and/or store fuel assemblies must not only safely enclose and absorb the radioactivity of the fuel assemblies, they must also allow for adequate cooling. In the art, there are two type of container systems used to transport and/or store fuel assemblies, canister-based systems and cask-based systems.

Generally speaking, there are two types of casks used for the transportation and/or storage of SNF, ventilated vertical overpacks ("VVOs") and thermally conductive casks. VVOs typically utilized in conjunction with a sealable canister that is loaded with the fuel assemblies and positioned within a cavity of the VVO. Such canisters, which are often multi-purpose canisters, often contain a fuel basket for receiving the fuel assemblies. An example of a canister and basket assembly designed for use with a VVO is disclosed in U.S. Pat. No. 5,898,747 (Singh), issued Apr. 27, 1999, the entirety of which is hereby incorporated by reference. The second type of casks are thermally conductive casks. In a typical thermally conductive cask, the fuel assemblies are loaded directly into a cavity formed by the cask body. A basket assembly is typically provided within the cavity itself to provide support for the fuel assemblies.

The fuel basket generally acts in conjunction with the cask to support the fuel in a particular pattern, minimize load transfer to the fuel, transfer heat to the cask and control criticality.

SUMMARY OF THE INVENTION

It is an object of the present invention to provide a fuel rack that can safely accommodate fuel assemblies.

Yet another object of the present invention is to provide a fuel rack having a horizontal cross-section that is non-rectangular in shape, such as hexagonal.

Still another object of the present invention is to provide a fuel rack that is cost effective to manufacture.

A further object of the present invention is to provide a fuel rack that can withstand high inertia loads acting in concert with hydraulic loads from moving water.

A yet further object of the present invention is to provide a fuel rack that allows natural thermosiphon flow of the pool water through the cells.

A still further object of the present invention is to provide a fuel rack that eliminates the need for neutron absorber plates.

It is a further object of the present invention to provide a fuel rack constructed of slotted plates.

Another object of the present invention is to provide a fuel rack that is compact and maximizes the storage space of a fuel pool.

A yet further object of the present invention is to provide a fuel rack that resists water corrosion.

Still another object of the present invention is to provide a fuel rack that maintains structural stability under radiation exposure.

Another object of the present invention is to provide a fuel rack that provides flux traps.

It is an object of the present invention to provide a fuel basket that provides higher structural integrity.

It is a further object of the present invention to provide a fuel basket that has fuel cells which correspond to the shape of the fuel assembly to be stored therein.

A yet further object of the present invention is to provide a fuel basket that maximizes the packing density of the spent nuclear fuel while maintaining a reactivity of 0.95 or less.

A yet further object of the present invention is to provide a fuel basket that is easy to manufacture and lightweight.

These and other objects are met by the present invention which, in one aspect can be a fuel rack having an array of cells for holding fuel assemblies comprising: a base plate having a top surface; a plurality of tubes, each tube having an inner surface that forms one of the cells; and the tubes connected to the top surface of the base plate in a substantially vertical orientation and in a pattern so that one or more of the cells are formed by outside surfaces of the adjacent tubes.

In another aspect, the invention can be a fuel rack for supporting fuel assemblies comprising: a plurality of hexagonal tubes having an internal cavity; a base plate having a top surface; the hexagonal tubes connected to the top surface of the base plate in a substantially vertical orientation and spaced from one another so that a flux trap space exists between all adjacent hexagonal tubes; and a plurality of spacers positioned in the flux trap spaces for maintaining the existence of the flux trap spaces, the spacers connected to the hexagonal tubes.

In yet another aspect, the invention can be a fuel rack having an array of cells for holding fuel assemblies comprising a plurality of slotted plates that are slidably interlocked with one another to form the array of cells.

In another aspect, the invention can be a fuel basket having a honeycomb-like grid that forms a plurality of substantially vertically oriented elongated cells. Most preferably, the basket assembly comprises one or more flux traps and is positioned within the cavity. The basket assembly can be constructed of a metal matrix composite material. In one embodiment, the basket assembly may utilize variable flux traps to maximize packing density. In such an embodiment, as the periphery of the basket assembly is approached, the width of the flux traps may decrease. In another embodiment, the basket assembly may utilize tubular elements of varying heights in a vertically staggered formation so that no two adjacent cells have interfaces which are vertically aligned.

In a further aspect, the invention can be an apparatus for supporting radioactive fuel assemblies comprising: a grid of cells for housing radioactive fuel assemblies, the grid formed by a plurality of hexagonal tubes having an outer surface and an inner surface that forms one of the cells, the plurality of hexagonal tubes arranged in an adjacent manner and in a pattern so that one or more of the cells is a resultant cell formed by the outside surfaces of surrounding hexagonal tubes.

In a yet further aspect, the invention can be an apparatus for supporting radioactive fuel assemblies comprising: a grid of cells for housing radioactive fuel assemblies, the grid formed by a plurality of tubes having inner surfaces that form the cells, the tubes arranged in an axially aligned and adjacent manner; each of the tubes formed by a plurality of tubular segments stacked in axial alignment, an interface formed between the adjacent tubular segments of each tube; and wherein the lengths of the tubular segments and the pattern in which the tubes are arranged to form the grid is such that none of the interfaces of adjacent tubes are aligned with one another.

In a still further aspect, the invention can be an apparatus for supporting radioactive fuel assemblies comprising: a bottom section comprising a plurality of bottom tubular segments of varying length, the bottom tubular segments arranged in an axially adjacent manner and in a pattern so that no two adjacent bottom tubular segments are the same length, the bottom edges of the bottom tubular segments being aligned; at least one middle section comprising a plurality of middle tubular segments of equal length, the middle section stacked atop the bottom section so that the middle tubular segments are axially aligned with the bottom tubular segments and the bottom edges of the middle tubular segments abut the top edges of the bottom tubular segments; and a top section comprising a plurality of top tubular segments of varying length, the top section stacked atop the middle section so that the top tubular segments are axially aligned with the middle tubular segments, the bottom edges of the top tubular segments abut the top edges of the bottom tubular segments, and the top edges of the top tubular segments are aligned.

In even another aspect, the invention can be a fuel rack having a grid of cells for holding fuel assemblies comprising: a base plate having a top surface; a plurality of hexagonal tubes, each hexagonal tube having inner surfaces that forms one of the cells; and the hexagonal tubes connected to the top surface of the base plate in a substantially vertical orientation and in a pattern so that one or more of the cells are formed by outside surfaces of the adjacent hexagonal tubes.

In yet another aspect, the invention can be a fuel rack having a grid of cells for holding fuel assemblies comprising: a base plate having a top surface; a plurality of tubes, each tube having an inner surface that forms one of the cells; and the tubes connected to the top surface of the base plate in a substantially vertical orientation and in a pattern so that one or more of the cells are formed by outside surfaces of the adjacent tubes.

In still another aspect, the invention can be a fuel rack for supporting fuel assemblies comprising: a plurality of hexagonal tubes having an internal cavity; a base plate having a top surface; the hexagonal tubes connected to the top surface of the base plate in a substantially vertical orientation and spaced from one another so that a flux trap space exists between all adjacent hexagonal tubes; and a plurality of spacers positioned in the flux trap spaces for maintaining the existence of the flux trap spaces, the spacers connected to the hexagonal tubes.

In another aspect, the invention can be a fuel rack for supporting fuel assemblies comprising: a plurality of tubes having an internal cavity; a base plate having a top surface; the tubes connected to the top surface of the base plate in a substantially vertical orientation and spaced from one another so that a flux trap space exists between all adjacent tubes; and a plurality of spacers positioned in the flux trap spaces for maintaining the existence of the flux trap spaces, the spacers connected to the tubes.

In a still further aspect, the invention can be a fuel rack having perimeter cells and non-perimeter cells for supporting fuel assemblies comprising: a base plate having a top surface; a plurality of hexagonal tubes, each hexagonal tube having inner surfaces that form one of the perimeter cells or the non-perimeter cells; and the hexagonal tubes connected to the top surface of the base plate in a substantially vertical orientation and in a pattern so that every third non-perimeter cell is formed by outside surfaces of six surrounding hexagonal tubes.

In yet another aspect, the invention can be a fuel basket for supporting radioactive fuel assemblies comprising: a plurality of tubes having an internal cavity for receiving a radioactive fuel assembly; the tubes arranged in a substantially vertical orientation and spaced from one another so that a flux trap space exists between all adjacent tubes, the tubes forming a storage grid having a central axis and a perimeter; a plurality of spacers positioned in the flux trap spaces for maintaining the existence of the flux trap spaces; and wherein the width of the flux trap space between adjacent tubes decreases with distance from the central axis of the storage grid.

DETAILED DESCRIPTION OF THE DRAWINGS

The present invention will now be described in relation to exemplary embodiments. It is to be understood that while certain details and structural arrangements are explained in detail with respect to a certain embodiment, the details and structural arrangements can be implemented into any of the embodiments.

I. Flux Trap Fuel Rack Embodiment

Figure 1:
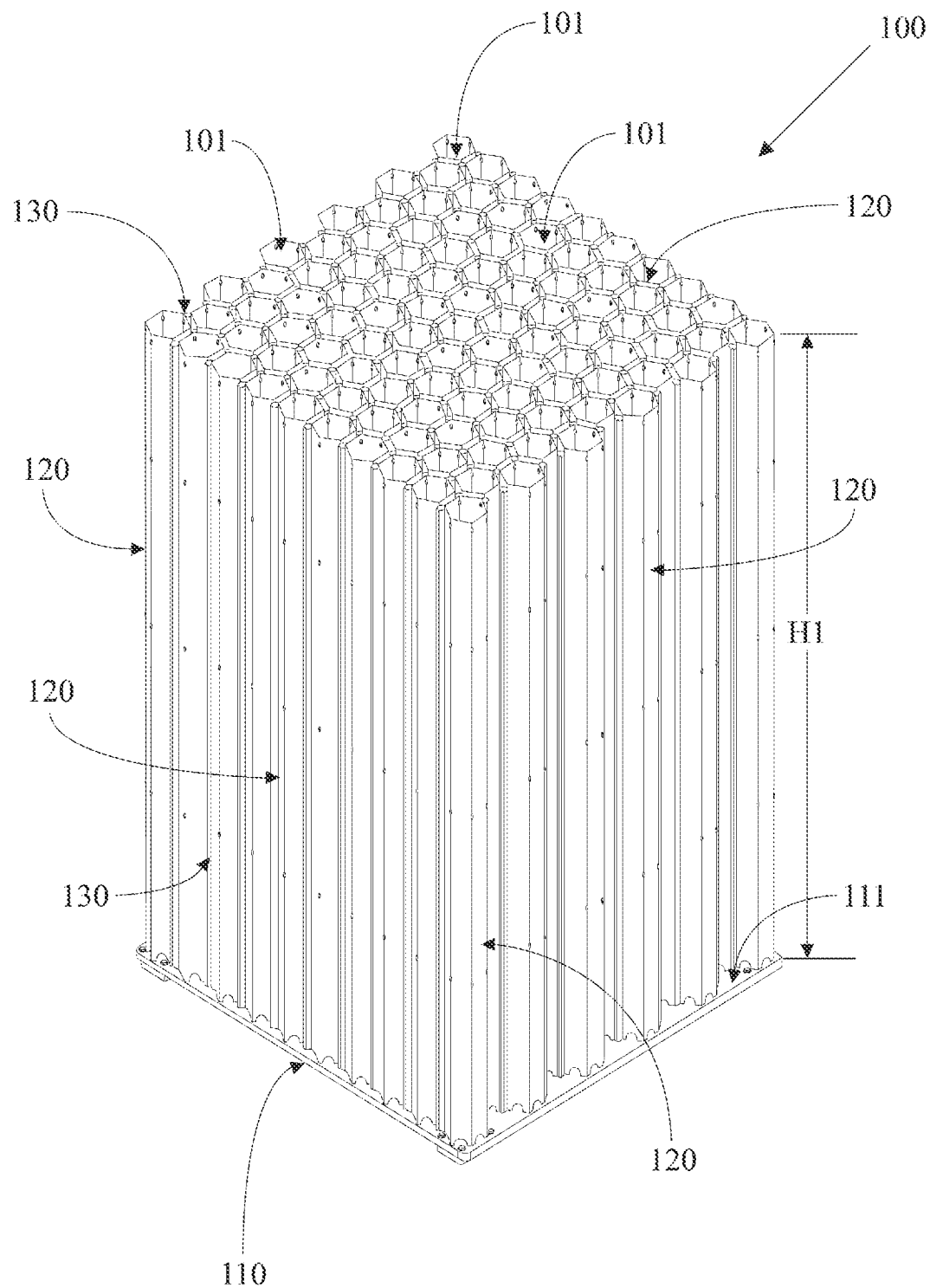
FIG. 1 is a top perspective view of a fuel rack according to one embodiment of the invention.

Referring to FIG. 1, a perspective view of a fuel rack 100 according to one embodiment of the present invention is disclosed. The fuel rack 100 is a cellular, upright, prismatic module. The illustrated embodiment of the fuel rack 100 is specifically designed to accommodate hexagonal fuel assemblies, such as VVER 1000 fuel assemblies. To this extent, each cell 101 of the fuel rack 100 is also generally hexagonal in shape (i.e., have a hexagonal horizontal cross-section) so as to geometrically accommodate a single hexagonal fuel assembly. However, it is to be understood that the concepts of the present invention can be modified to accommodate any shaped fuel assembly, including rectangular, octagonal, round, etc.

In describing the fuel rack 100 and its component parts below, relative terms such as top, bottom, above, below, horizontal, vertical upper and lower will be used in relation to the fuel rack 100 being in the illustrated substantially vertical orientation of FIG. 1. Additionally, in order to avoid clutter in the drawings, only a few of each component are numbered with the understanding that the reader will be able to identify duplicate elements.

Figure 2:
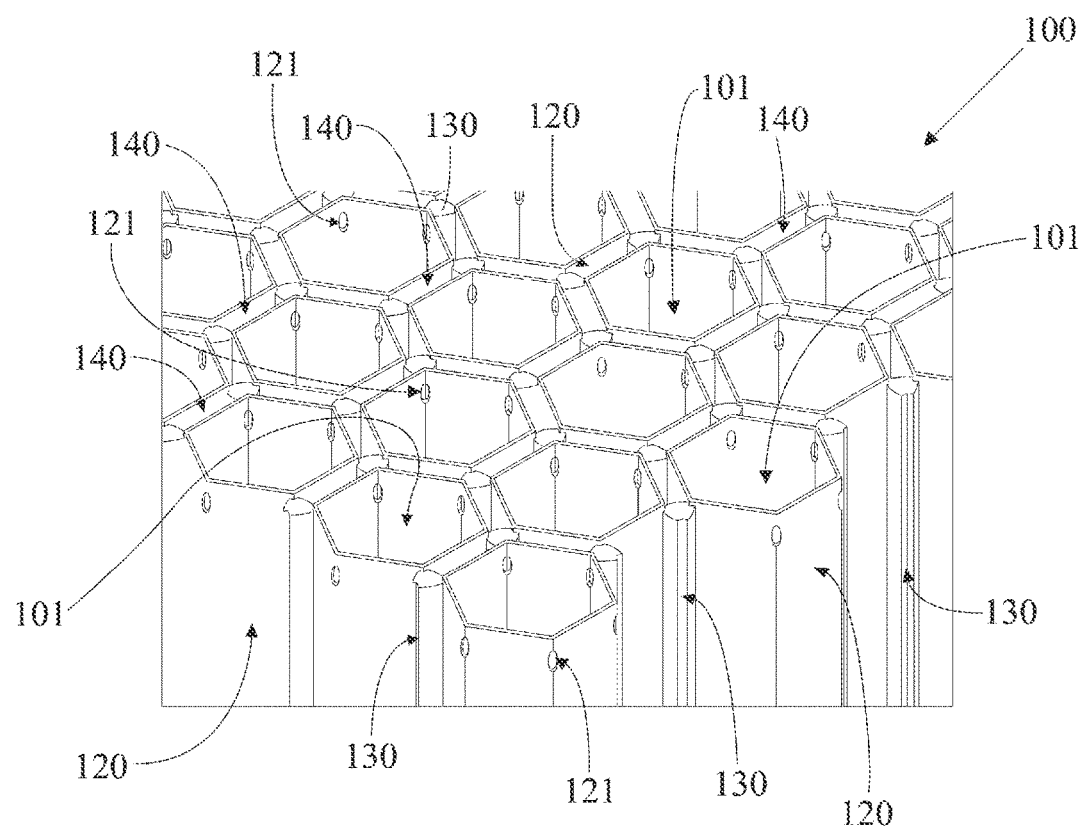
FIG. 2 is a close up view of a top portion of the fuel rack of FIG. 1.

The fuel rack 100 generally comprises a base plate 110, a plurality of hexagonal tubes 120, and a plurality of spacing rods 130 (best visible in FIG. 2). The hexagonal tubes 120 are connected to the top surface 111 of the base plate 110 in a substantially vertical orientation. In this embodiment, the axis of each hexagonal tube 120 is not only substantially vertical but also substantially perpendicular to the top surface 111 of the base plate 110. The connection between the hexagonal tubes 120 and the base plate 110 is achieved by welding the bottom edge of the hexagonal tubes 120 to the top surface of the base plate 110. Of course, other connection techniques can be utilized with minor modification, including mechanical connections such as bolting, clamping, threading, etc.

The top ends of the hexagonal tubes 120 remain open so that a fuel assembly can be slid into the internal cavity 101 (also referred to as a cell) formed by the inner surfaces of the hexagonal tubes 120. Each hexagonal tube 120 can be a single-part tube that extends the entire desired height $H_1$ or can be constructed of multiple partial height tubes that together add up to the desired height $H_1$. It is preferred that the height $H_1$ be sufficient so that the entire height of the fuel assembly is within the hexagonal tube 120

The hexagonal tubes 120 are connected to the rectangular base plate 110 in an adjacent and spaced pattern to form a honeycomb-like grid of the cells 101. The cells 101 are substantially vertical elongated cavities for receiving the radioactive fuel assemblies via their open top ends. While a generally rectangular gridwork of cells 101 is illustrated, the fuel rack 100 can be designed to take on any desired shape. The geometric arrangement of the hexagonal tubes 120 will be discussed in greater detail below with respect to FIGS. 2-3.

The hexagonal tubes 120 preferably constructed of a metal-matrix composite material, and more preferably a discontinuously reinforced aluminum/boron carbide metal matrix composite material, and most preferably a boron impregnated aluminum. One such suitable material is sold under the tradename Metamic™. The hexagonal tubes 120 perform the dual function of reactivity control as well as structural support. The base plate 110 is preferably constructed of a metal that is metallurgically compatible with the material of which the hexagonal tubes 120 are constructed for welding.

Figure 3:
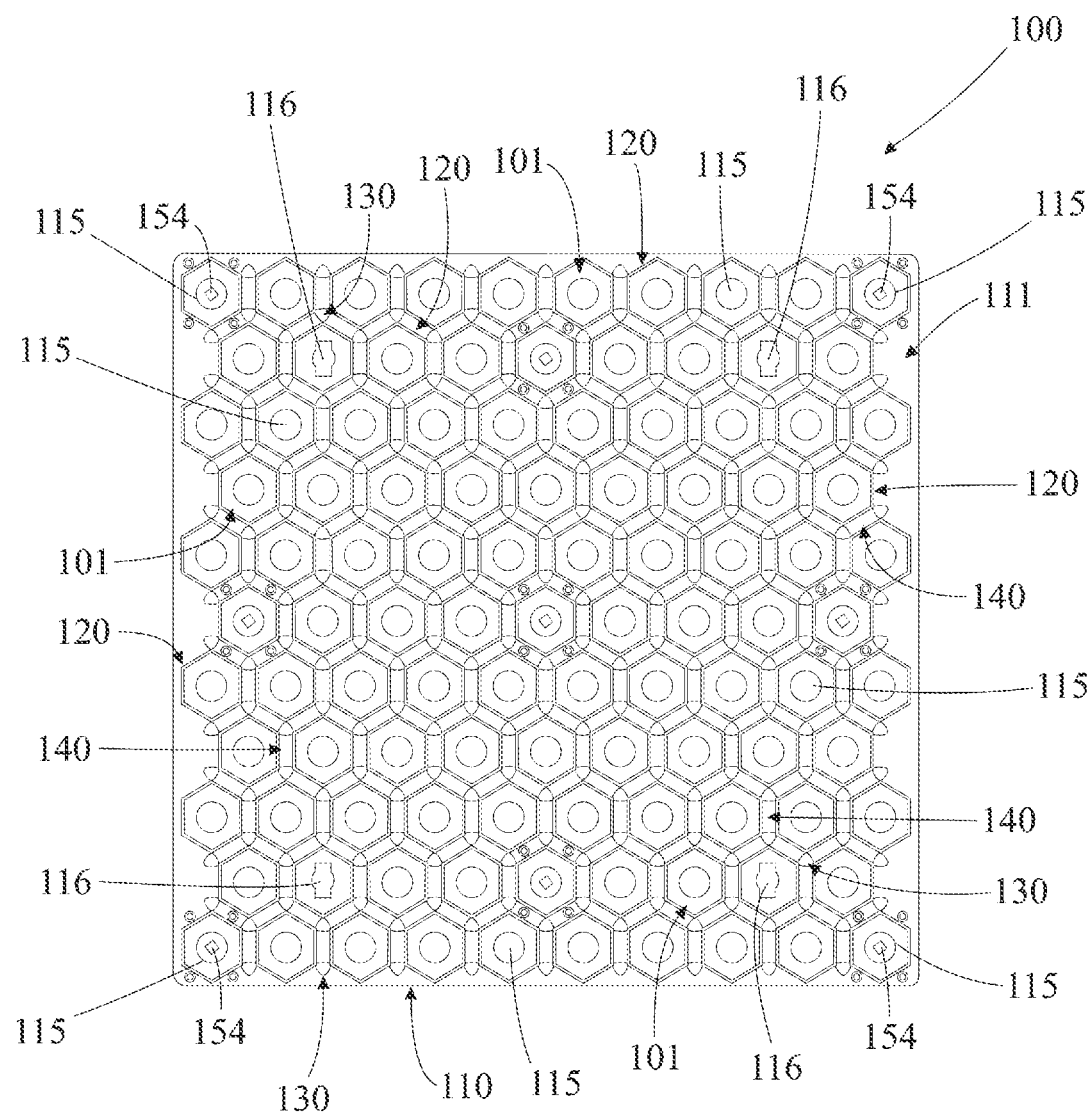
FIG. 3 is a top view of the fuel rack of FIG. 1.

Referring now to FIGS. 2-3 concurrently, each hexagonal tube 120 is arranged so as to be spaced from all adjacent hexagonal tubes 120 so that a gap 140 exists between each hexagonal tube 120 and its immediately adjacent hexagonal tubes 120. The gap 140 acts a neutron flux trap that decreases and/or eliminates the danger of criticality. The flux trap space 140 can be designed to be any desired width and the exact width will depend on the radiation levels of the fuel assemblies to be stored, the material of construction of the tubes 120, and properties of the pool water in which the fuel rack 100 will be submerged. In one embodiment, the flux trap spaces 140 will have a width between 30 and 50 millimeters and more preferably between 25 to 35 millimeters and most preferably about 38 millimeters.

Spacers, which are in the form of spacing rods 130 in the illustrated embodiment, are inserted into the flux trap spaces 140 so as to maintain the existence of the flux trap spaces 140 at the desired width and to provide added structural stability. While the spacers are illustrated as elongated rods 130 that extend the entire height $H_1$ of the hexagonal tubes 120, the spacers are not so limited and can take on a wide variety of shapes and sizes. For example, the spacers could be merely blocks or pins if desired in some embodiments.

A spacing rod 130 is positioned at the juncture between the edges of three adjacent hexagonal tubes 120. Thus, each spacing rod 130 (with the exception of those spacing rods 130 along the perimeter) contacts three hexagonal tubes 120. For added integrity and ease of construction, the spacing rods 130 have three axial grooves along their length that act as nesting volumes for receiving the edge of the hexagonal tubes 120. In the illustrated embodiment, the spacing rods 130 have a horizontal cross-section that is generally in the shape of a truncated triangle, wherein a nesting groove is formed into each truncated apex. Of course, the spacing rods 130 can take on other shapes with or without the grooves.

The spacing rods 130 are preferably made of aluminum or a metal matrix material, such as boron impregnated aluminum. The spacing rods 130 are plug welded to the hexagonal tubes 120 in which they are in contact with via elongated holes 121 located at the edges/corners or the hexagonal tubes 120. The shape, location and number of plug weld holes 120 will vary depending on design considerations and is in no way limiting of the present invention. The plug holes 121 are uniformly on each corner the hexagonal tubes 120 to facilitate uniform manufacture but this is not necessary. The plug holes 121 can be formed by punching, cutting, or during a molding process.

Figure 4:
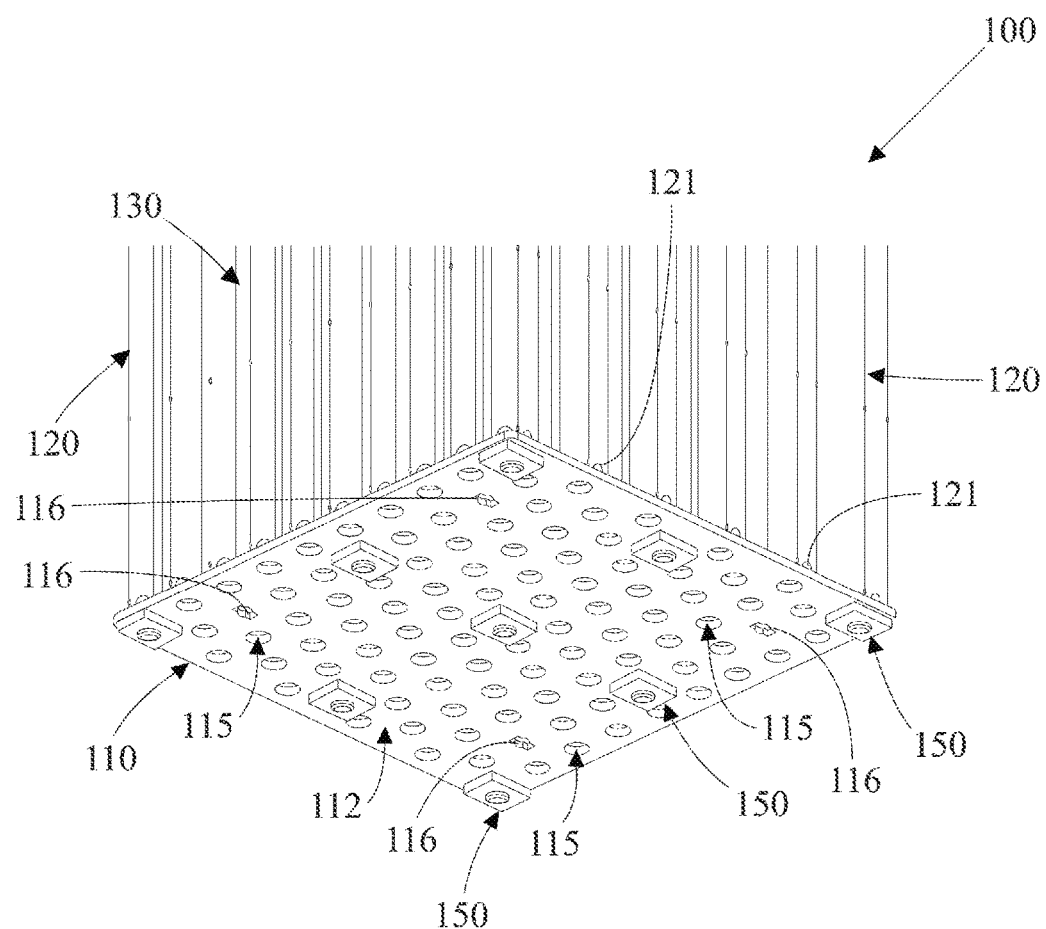
FIG. 4 is a bottom perspective view of the fuel rack of FIG. 1.

Referring now to FIGS. 3-4 concurrently, the base plate 110 also comprises a plurality of flow holes 115 extending through the base plate 110 from its bottom surface 112 to its top surface 111. Similarly, the base plate 110 also comprises four oblong holes 116 (second row in from the corners) for lifting and installing the fuel rack 100 within the fuel pool. A special lifting beam with four long reach rods is used to interact with the oblong holes 116 to grapple the fuel rack 100 and place it in the pool.

The flow holes 115 (and oblong holes 116) create passageways from below the base plate 100 into the cells 101 formed by the hexagonal tubes 120. Preferably, a single flow hole 115 is provided for each cell 101. The flow holes 115 are provided as inlets to facilitate natural thermosiphon flow of pool water through the cells 101 when fuel assemblies having a heat load are positioned therein. More specifically, when heated fuel assemblies are positioned in the cells 101 in a submerged environment, the water within the cells 101 surrounding the fuel assemblies becomes heated, thereby rising due to increased buoyancy. As this heated water rises and exist the cells 101 via their open top ends, cool water is drawn into the bottom of the cells 101 via the flow holes 115. This heat induced water flow along the fuel assemblies then continues naturally.

Figure 5:
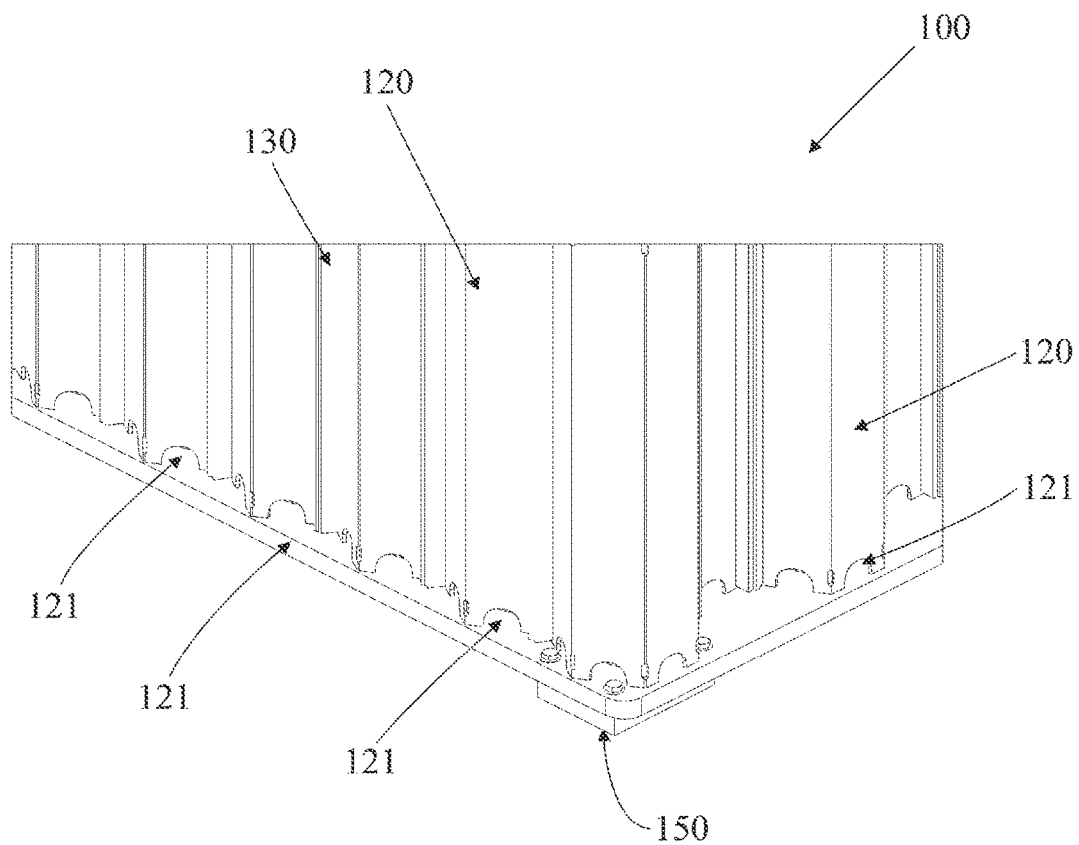
FIG. 5 is a close-up view of a bottom corner of the fuel rack of FIG. 1.

As can best be seen in FIG. 5, a plurality of auxiliary cutouts/holes 121 are provided in the hexagonal tubes 120 at or near their bottom edge. The auxiliary holes 121 act as additional inlet openings for incoming pool water to facilitate the thermosiphon flow during the cooling process. Moreover, as will be described below, the flow holes 115 of certain cells 101 are blocked by the attachment of adjustable height pedestals 150. The auxiliary holes 121 of the hexagonal tubes 120 that form these cells 101 are thus the sole source of incoming cool water for fuel assemblies stored therein. While an auxiliary hole 121 is provide din each face of each and every hexagonal tube 120 in the fuel rack 100, it is to be understood that this may not be necessary in all instances.

As a side note, the flow holes 115 (and holes 116) perform an additional function of providing an access-way into to the cells 101 for a "goose-neck welder" for welding the hexagonal tubes 120 to the top surface of the base plate 110.

Referring back to FIGS. 3-4, the base plate 110 also comprises a plurality of adjustable height pedestals 150 connected to the bottom surface 112 of the base plate 110. The adjustable height pedestals 150 ensure that a space exists between the floor of the fuel pool and the bottom surface 112 of the base plate 110, thereby creating an inlet plenum for water to flow through the flow holes 115.

The adjustable height pedestals 150 are spaced to provide uniform support of the base plate 110 and thus the fuel rack 100. Each pedestal 150 is individually adjustable to level and support the rack on a non-uniform spent fuel pool floor. The pedestals 150 are bolted to the base plate 110. Of course, if desired, the pedestals 150 can be attached top the base plate 110 by other means, including welding or threading. In the event of welded pedestal 15, an explosion-bonded stainless-Aluminum plate may be used to make the transition. For a welded pedestal, the bolts and bolt holes are eliminated.

Figure 6A:
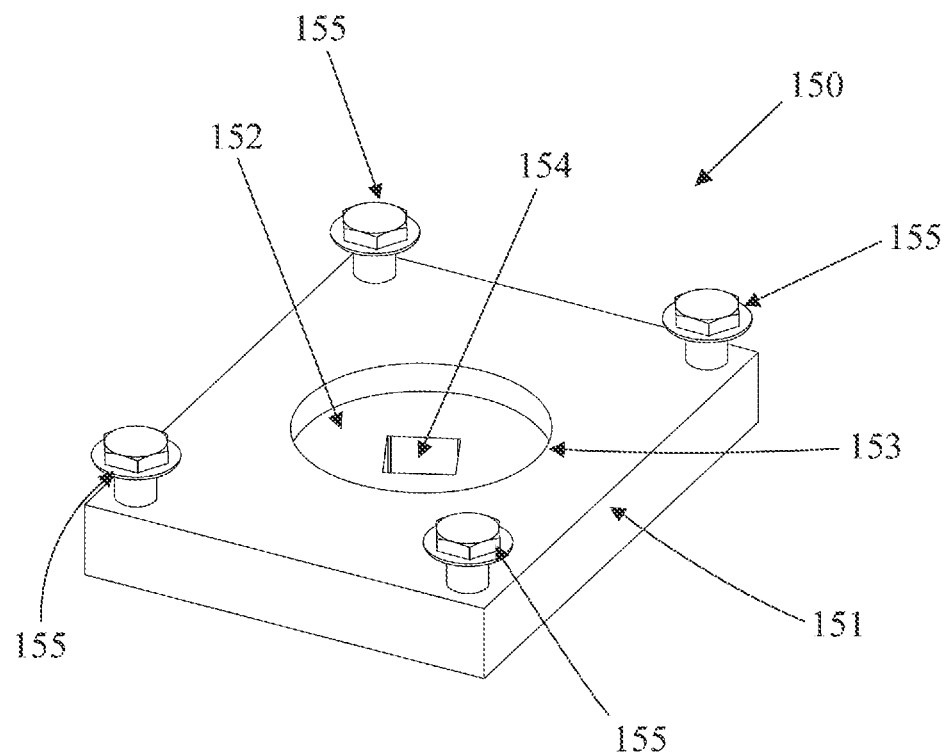
FIG. 6A is a top perspective view of an adjustable height pedestal removed from the fuel rack of FIG. 1.
Figure 6B:
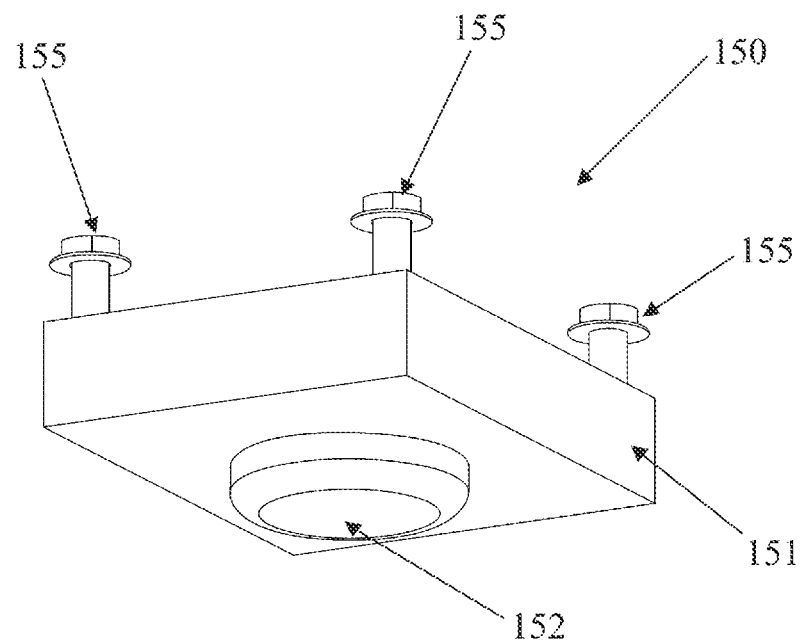
FIG. 6B is a bottom perspective view of the adjustable height pedestal of FIG. 6A.

Referring now to FIGS. 6A-6B, the construction details of the adjustable height pedestals 150 will be described. Each of the adjustable height pedestals 150 comprises a block 151 and a cylindrical peg 152 that acts as the foot. The block 152 is connected to the base plate 110 via bolts 155.

The block 151 comprises a central hole 153 which has a threaded inner surface (not visible). Similarly, the outer surface of a portion of the peg 151 is also threaded with corresponding threads. The peg 152 is inserted into the hole 153 and threadably engaged therein to the block 151.

The peg 152 also comprises a rectangular depression 154 in its top surface for receiving a tool for turning the peg 152. Of course, the depression can be any shape that will facilitate rotational engagement with a tool. Moreover, other means for engaging and turning the peg 152 can be sued including a tab, a screw head, a bolt head, etc.

Because of the threaded connection between the peg 152 and the block 151, turning the peg 152 via the depression 154 results in increasing or decreasing the height the peg 152 protrudes from the bottom surface of the block 151. Adjustment of the peg 152 is facilitated by a long-handled tool that is inserted into the cell 101. The depression 154 of the peg 152 is accessible through the flow hole 115 in that cell 101 (see FIG. 3).

The bottom portion of the peg 152 has a rounded edge to prevent catching and tearing of the liner in a seismic-induced slide of the fuel rack 100. A break in the liner means problems for the site because of leakage. If desired, the bottom surface of the peg 152 can be formed or covered with a low friction sliding material.

II. Non-Flux Trap Fuel Rack Embodiment Incorporating Resultant Cells

Referring now to FIGS. 7-10 concurrently, a second embodiment of a fuel rack 200 is illustrated. Similar to the rack above, the fuel rack 200 is a cellular, upright, prismatic module. The illustrated embodiment of the fuel rack 200 is specifically designed to accommodate hexagonal fuel assemblies, such as VVER 1000 fuel assemblies. Each cell 201 of the fuel rack 200 is also generally hexagonal in shape (i.e., have a hexagonal horizontal cross-section) so as to geometrically accommodate a single hexagonal fuel assembly. However, it is to be understood that the concepts of the present invention can be modified to accommodate any shaped fuel assembly, including rectangular, octagonal, round, etc.

Figure 7:
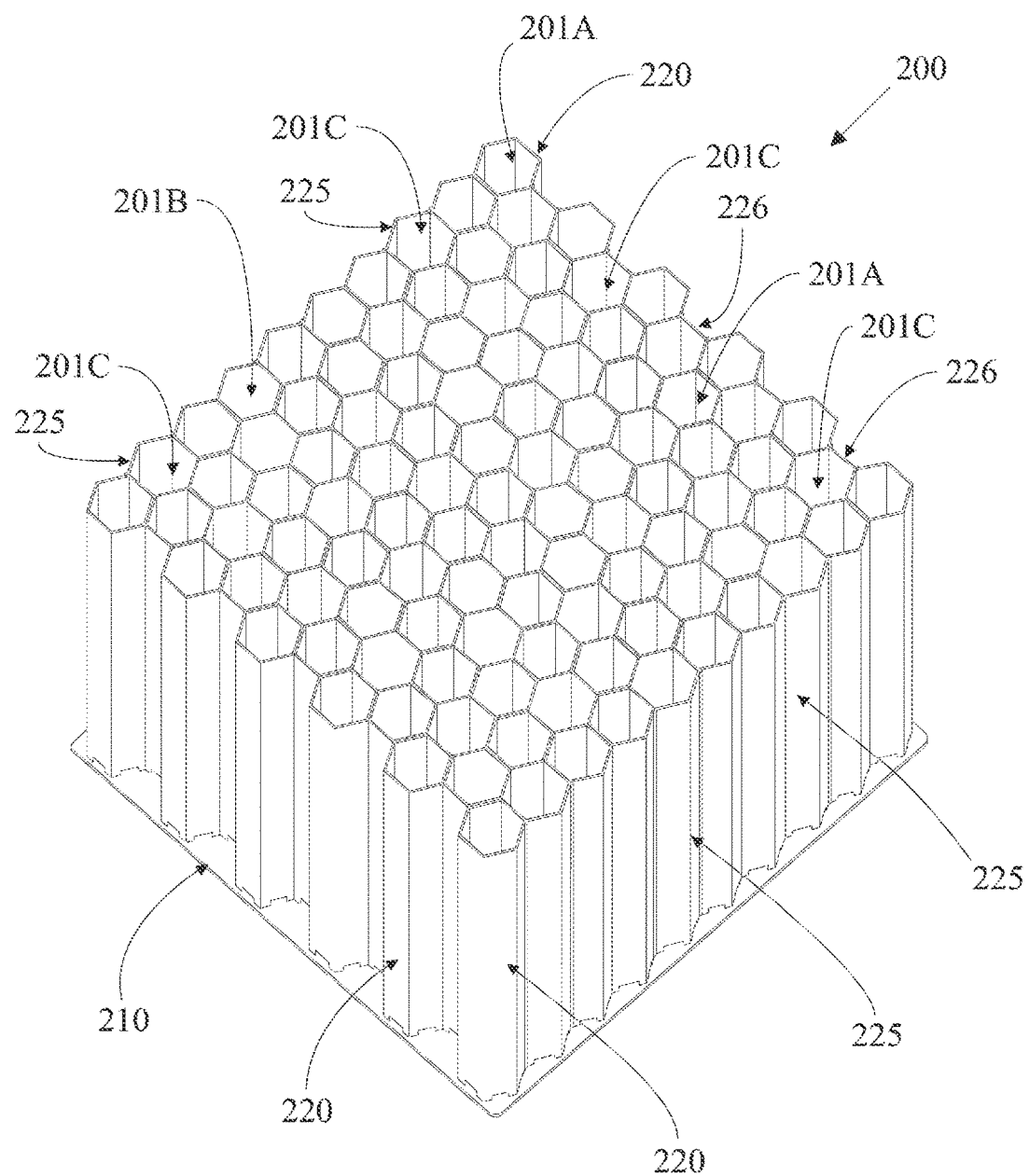
FIG. 7 is a top perspective view of a fuel rack according to a second embodiment of the invention that includes flux traps.
Figure 8:
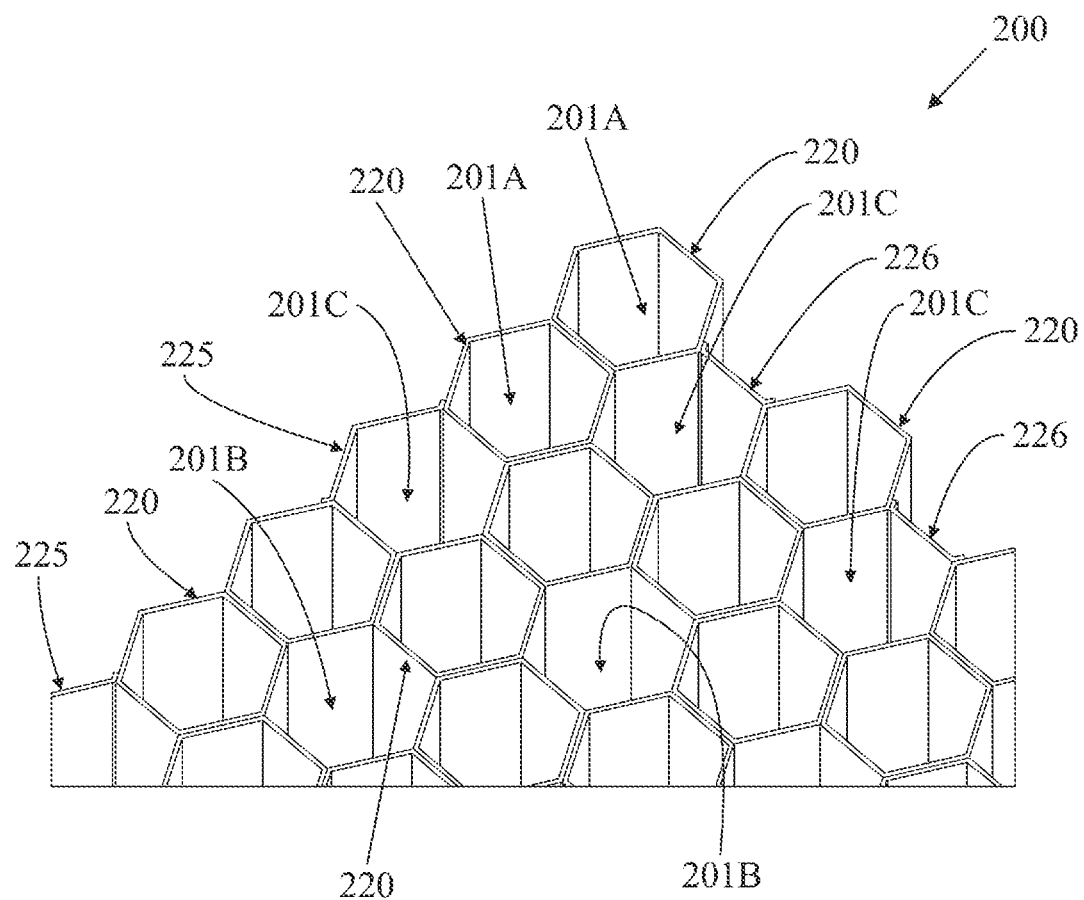
FIG. 8 is a close up view of a top portion of the fuel rack of FIG. 7.

In describing the fuel rack 200 and its component parts below, relative terms such as top, bottom, above, below, horizontal, vertical upper and lower will be used in relation to the fuel rack 200 being in the illustrated substantially vertical orientation of FIG. 7. Additionally, in order to avoid clutter in the drawings, only a few of each component are numbered with the understanding that the reader will be able to identify duplicate elements.

The driving factor that leads to the structural differences between fuel rack 100 (discussed above) and the fuel rack 200 is that the fuel rack 200 is designed to be used with fuel assemblies that do not require the presence of a neutron flux trap between adjacent cells 201. Thus, the inclusion of neutron flux traps in fuel racks when not needed is undesirable because valuable pool floor area is unnecessarily wasted. Of course, both fuel rack types 100, 200 may be stored side by side in the same pool.

Because many of the structural and functional features of the fuel rack 200 are identical to the fuel rack 100, only those aspect of the fuel rack 200 that are different will be discussed below with the understanding that the other concepts discussed above with respect to fuel rack 100 are applicable.

The fuel rack 200 comprises a plurality of hexagonal tubes 220. The hexagonal tubes 220 are connected to the top surface 211 of the base plate 210 in a substantially vertical orientation. In this embodiment, the axis of each hexagonal tube 220 is not only substantially vertical but also substantially perpendicular to the top surface 211 of the base plate 210. The connection between the hexagonal tubes 220 and the base plate 210 is achieved by welding the bottom edge of the hexagonal tubes 220 to the top surface of the base plate 110. Of course, other connection techniques can be utilized with minor modification, including mechanical connections such as bolting, clamping, threading, etc.

The top ends of the hexagonal tubes 220 remain open so that a fuel assembly can be slid into the internal cavity 201A (also referred to as a cell) formed by the inner surfaces each hexagonal tube 220. The hexagonal tubes 220 are connected atop the rectangular base plate 110 in a special geometric arrangement so that certain non-perimeter cells 201D are formed by the outside surfaces of the surrounding hexagonal tubes 220. Additionally, certain perimeter cells 201B-C are formed by the outside surfaces of the surrounding hexagonal tubes 220 and an added plate, which depending on the location is either a two-panel plate 225 or a single panel plate 226.

In other words, the cells 201B-201D are not the internal cavities of any tubular structures but are resultant cavities formed by either (1) the outer surfaces of the surrounding hexagonal tubes 220; or (2) the outer surfaces of the surrounding hexagonal tubes 220 and an additional plate structure 225, 226. As used herein, all three cell types 201B-201D will be referred to as "resultant cells" or "developed cells."

Despite their different methods of formation, all of the cells 201A-201D have a horizontal cross-section that is generally hexagonal. Of course, the result cell concept can be applied to a host of other geometries if desired. The special geometric arrangement of the hexagonal tubes 220 and an additional plate structure 225-226 atop the base plate 210 will now be discussed.

Figure 9:
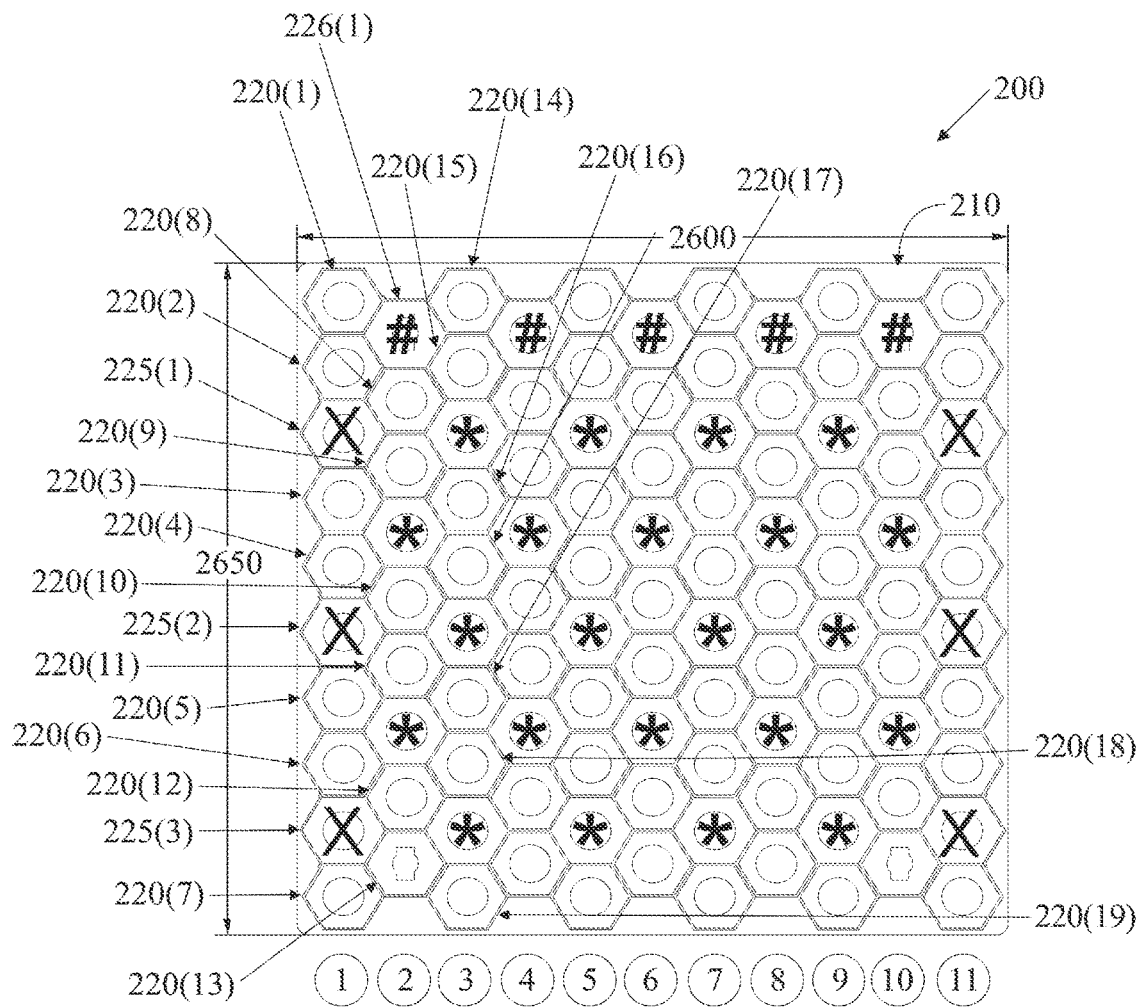
FIG. 9 is a top view of the fuel rack of FIG. 7.

As can best be seen in FIG. 9, the hexagonal tubes 220 are geometrically arranged atop the base plate 210 in rows 1-11 (indicated numerically in a circle). Of course, any number of rows or columns may be created for the fuel rack 200. The details of the formation of three different kinds of resultant cells will be described in reference to rows 1 through 3 with the understanding that the certain patterns repeat and thus the entire fuel rack 200 can be constructed.

A. Formation of Perimeter Resultant Cells X

The formation of perimeter resultant cells formed by the combination of outside surfaces of the hexagonal tubes and a two-panel plate structure (referred to above as type 201C cells) will now be described. For ease of reference and to avoid clutter, all perimeter resultant cells formed by the combination of outside surfaces of the hexagonal tubes and a two-panel plate structure are marked with an X.

In row 1, the hexagonal tubes 220(1), 220(2) are arranged atop the base plate 210 in the top left corner in an adjacent and abutting manner so that the opposing outside surfaces of the hexagonal tubes 220(1), 220(2) are in surface contact. The internal cavities of the hexagonal tubes 220(1), 220(2) act as the first two cells 201A (not marked). To reduce further clutter, all cells 201A that are formed by the inner surfaces of a single hexagonal tube 220 are left blank in FIG. 9.

A second pair hexagonal tubes 220(3), 220(4) are arranged atop the base plate 210 within row 1 and spaced from the first pair of hexagonal tubes 220(1), 220(2). Similar to the first pair of hexagonal tubes 220(1), 220(2), the second pair of hexagonal tubes 220(3), 220(4) are in arranged in an adjacent and abutting manner so that the opposing outside surfaces of the hexagonal tubes 220(3), 220(4) are in surface contact. While the second pair of hexagonal tubes 220(3), 220(4) are aligned with the first pair of hexagonal tubes 220(1), 220(2) in row 1, they are also spaced so as to leave room for a first perimeter resultant cell X.

A two-panel plate structure 225(1) is connected to the left sides of the hexagonal tubes 220(3), 220(4) to enclose the open lateral side of the perimeter resultant cell X. Specifically, the two panel plate structure 225(1) is connected to the hexagonal tube 220(2) and the hexagonal tube 220(3) by welding or another technique. The perimeter resultant cell X is completed by the outside surfaces of the hexagonal tubes 220(8), 220(9) located in row 2. Thus, a complete hexagonal resulting cell X is formed by the cooperation of the outside surfaces of the hexagonal tubes 220(2), 220(3), 220(8), 220(9) and the plate structure 225(1). The resultant cell X has a horizontal cross-sectional shape that corresponds to the shape of all other cells in the fuel rack 200.

B. Formation of Resultant Perimeter Cells #

The formation of perimeter resultant cells formed by the combination of outside surfaces of the hexagonal tubes and a single-panel plate structure (referred to above as type 201B cells) will now be described. For ease of reference and to avoid clutter, all perimeter resultant cells formed by the combination of outside surfaces of the hexagonal tubes and a single-panel plate structure are marked with an #.

Turning now to row 2, the pair of hexagonal tubes 220(8), 220(9) are arranged atop the base plate 210 in an adjacent and abutting manner with each other and the hexagonal tubes 220(2), 220(3) from row 1. When so arranged, the opposing outside surfaces of the hexagonal tubes 220(8), 220(9) are in surface contact with one another. The opposing outside surfaces of the hexagonal tubes 220(8), 220(2) are also in surface contact with one another. And, the opposing outside surfaces of the hexagonal tubes 220(9), 220(3) are in surface contact with one another.

The hexagonal tubes 220(14), 220(15) are arranged in row 3 atop the base plate 210 in an adjacent and abutting manner with each other and so that the outside surface of the hexagonal tube 220(15) is in surface contact with the outside surface of the hexagonal tube 220(8) from row 2. A single-panel plate structure 226(1) is connected to the hexagonal tubes 220(1), 220(14) to enclose the open lateral side of the perimeter resultant cell #. Specifically, the single-panel plate structure 226(1) is connected to the hexagonal tube 220(1) and the hexagonal tube 220(14) by welding or another technique. Thus, a complete hexagonal resulting cell # is formed by the cooperation of the outside surfaces of the hexagonal tubes 220(1), 220(2), 220(8), 220(14), 220(15) and the single-panel plate structure 226(1). The resultant cell # has a horizontal cross-sectional shape that corresponds to the shape of all other cells in the fuel rack 200.

C. Formation of Resultant Perimeter Cells *

The formation of non-perimeter resultant cells formed completely by the cooperation of outside surfaces of the surrounding hexagonal tubes (referred to above as type 201D cells) will now be described. For ease of reference and to avoid clutter, all non-perimeter resultant cells formed by the cooperation of the outside surfaces of the hexagonal tubes are marked with an *.

In order to avoid redundancy, the arrangement and interaction of the hexagonal tubes atop the base plate will be omitted with the understanding that the discussion above is applicable. In row 2, a complete hexagonal resulting cell * is formed by the cooperation of the outside surfaces of the hexagonal tubes 220(3), 220(4), 220(9), 220(10), 220(16), 220(17). The resultant cell * has a horizontal cross-sectional shape that corresponds to the shape of all other cells in the fuel rack 200.

Turning back to the general manufacture and formation of the fuel rack 200, all connections between the hexagonal tubes 220 and the base plate 210 are accomplished as described above with respect to the fuel rack 100. Additionally, connections between adjacent the hexagonal tubes 220 can be accomplished via the plug holes described above. Furthermore, in order to ensure that the resultant cells 201B-D are properly sized, the fuel rack may be formed in the following manner.

First, an array of hexagonal tubes 220 are arranged in the desired geometric configuration so that all six outside surfaces of all non-perimeter hexagonal tubes 220 are in contact with the outside surface of the adjacent hexagonal tubes 220. In other words, at this stage, the fuel rack 200 only comprises cells of the type 201A that formed by the internal cavities of the hexagonal tubes 220 themselves. However, due to pre-planning, the location of those spots which are to be resultant cells 201B-D are noted. The array of hexagonal tubes 220 are positioned atop the base plate 210 and the necessary welding is performed. However, any hexagonal tubes 220 that are located in the spots where a resultant cell is desired are not welded to either the base plate 210 or to the adjacent hexagonal tubes 220. These hexagonal tubes 220 are then slidably removed from the array, thereby leaving the resultant cell 201B-D. As necessary, the single-panel plates 226 and the two-panel plates 225 are then connected to enclose the perimeter resultant cells 220B-C.

Furthermore, if desired, neutron absorbing panels can be added to the array as necessary. The fuel rack 200 does not contain any flux traps.

III. Slotted-Plate Fuel Rack Embodiment

Figure 10:
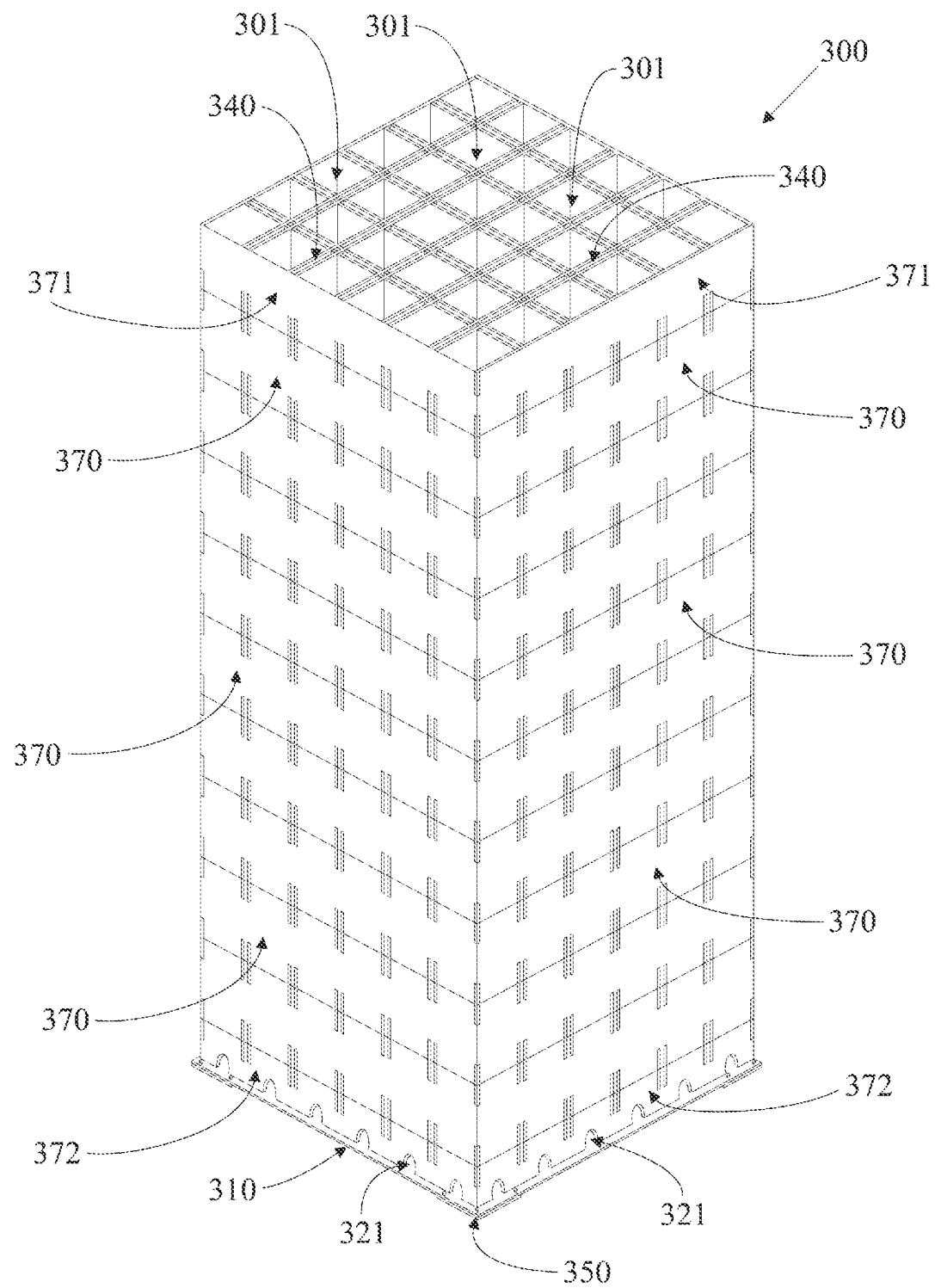
FIG. 10 is a top perspective view of a fuel rack according to one embodiment of the invention that is constructed of a slotted plates.

Referring now to FIG. 10, a fuel rack 300 that is formed from a plurality of slotted-plates arranged in a self-interlocking arrangement is illustrated. The fuel rack 300 is designed so as to have flux traps 340 and rectangular cells 301. However, it is to be understood that the slotted-plate concept described below can be utilized to form non-flux trap fuel racks and can be utilized to create fuel racks having any shaped cells, including without limitation the fuel racks discussed above.

In describing the fuel rack 300 and its component parts below, relative terms such as top, bottom, above, below, horizontal, vertical upper and lower will be used in relation to the fuel rack 300 being in the illustrated substantially vertical orientation of FIG. 10. Additionally, in order to avoid clutter in the drawings, only a few of each component are numbered with the understanding that the reader will be able to identify duplicate elements.

Because many of the structural and functional features of the fuel rack 300 are identical to the fuel racks 100, 200 above, only those aspect of the fuel rack 300 that are different will be discussed below with the understanding that the other concepts and structures discussed above with respect to the fuel racks 100, 200 are applicable.

The fuel rack 300 generally comprises an array of cells 301 that are formed by a gridwork of slotted plates 370-372 that are slidably assembled in an interlocking rectilinear arrangement. The gridwork of slotted plates 370-372 are positioned atop and connected to a base plate 310. The entire fuel rack body is formed out of three types of slotted plates, a middle plate 370, a top plate 371 and a bottom plate 372. The bottom plate comprises the auxiliary holes 321 as discussed above for facilitating thermosiphon flow into the cells 301.

Figure 11A:
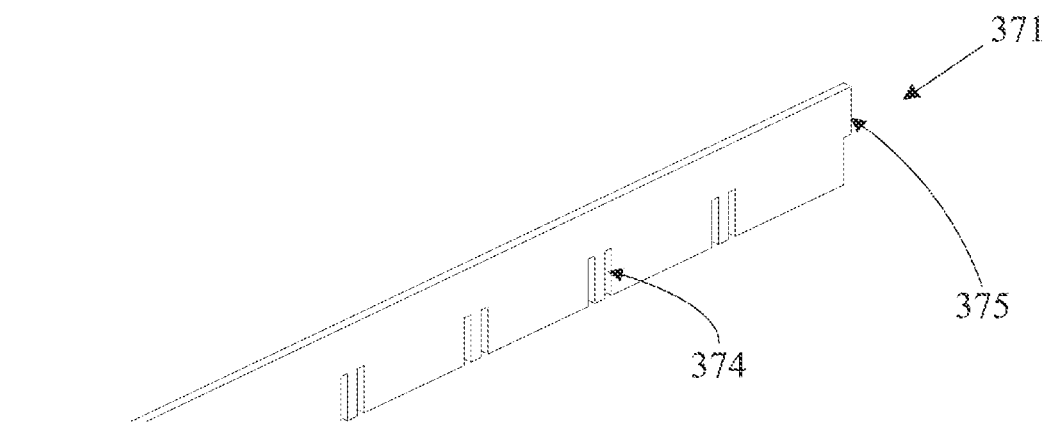
FIG. 11A is a perspective view of first slotted plate used in the construction of the fuel rack of FIG. 10.
Figure 11B:
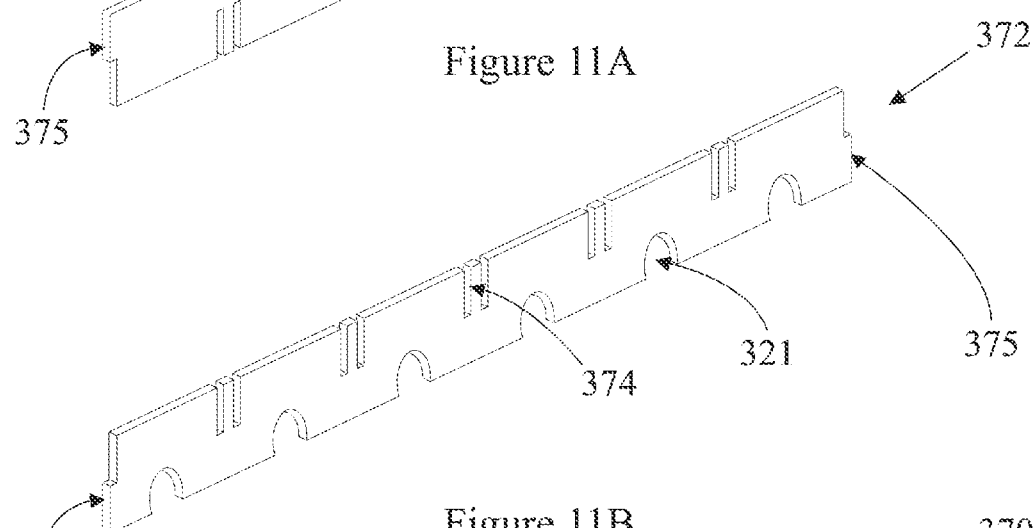
FIG. 11B is a perspective view of a second slotted plate used in the construction of the fuel rack of FIG. 10.
Figure 11C:
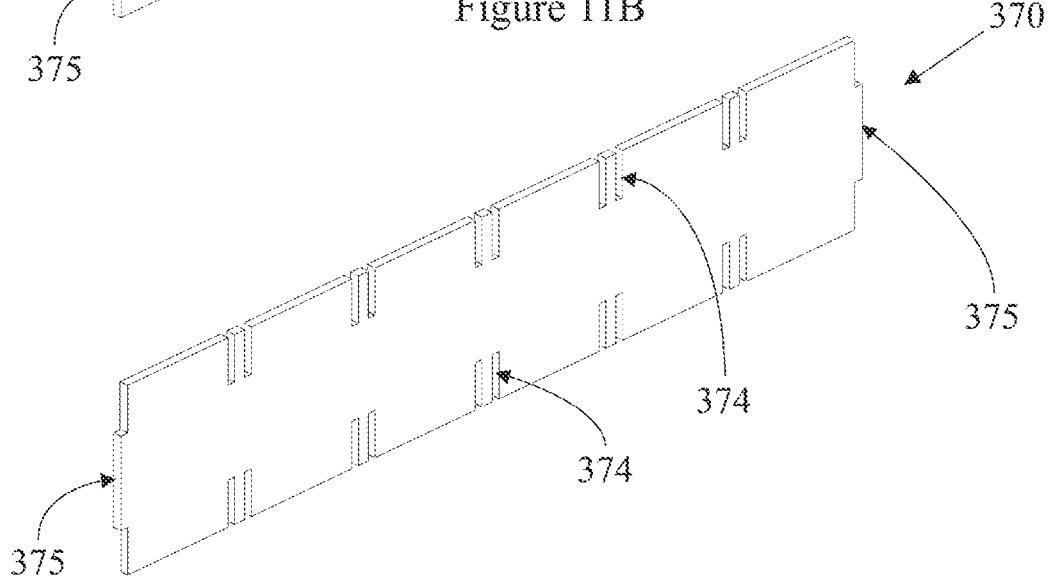
FIG. 11C is a perspective view of a third slotted plate used in the construction of the fuel rack of FIG. 10.

Referring now to FIGS. 11A-11C, one of the middle plates 370, top plates 371 and bottom plates 372 are illustrated individually. As can be seen, the bottom plate 372 is merely a top half of the middle plate 370 with the auxiliary holes 321 cutout at its bottom edge. Similarly, the top plate 371 is merely a bottom half of the middle plate 370. The bottom and top plates 372, 371 are only used at the bottom and top of the fuel rack body to cap the middle body segments 380 (FIG. 12) formed from the middle plates 370 so that the fuel rack body has a level top and bottom edge.

Each of the plates 370-372 comprise a plurality of slots 374 and end tabs 375 strategically arranged to facilitate sliding assembly to create the fuel rack body. The slots 374 are provided in both the top and bottom edges of the plates 370-372. The slots 374 on the top edge of each plate 370-372 are aligned with the slots 374 on the bottom edge of that same plate 370-372. The slots 374 extend through the plates 370-372 for one-fourth of the height of the plates 370-372. The end tabs 375 extend from lateral edges of the plates 370-372 and are preferably about one-half of the height of the plates 370-372. The end tabs 375 slidably mate with the indentations 376 in the lateral edges of adjacent plates 370-372 that naturally result from the existence of the tabs 375.

The plates 370-372 are preferably constructed of a metal-matrix composite material, and more preferably a discontinuously reinforced aluminum/boron carbide metal matrix composite material, and most preferably a boron impregnated aluminum. One such suitable material is sold under the tradename Metamic™.

Figure 12:
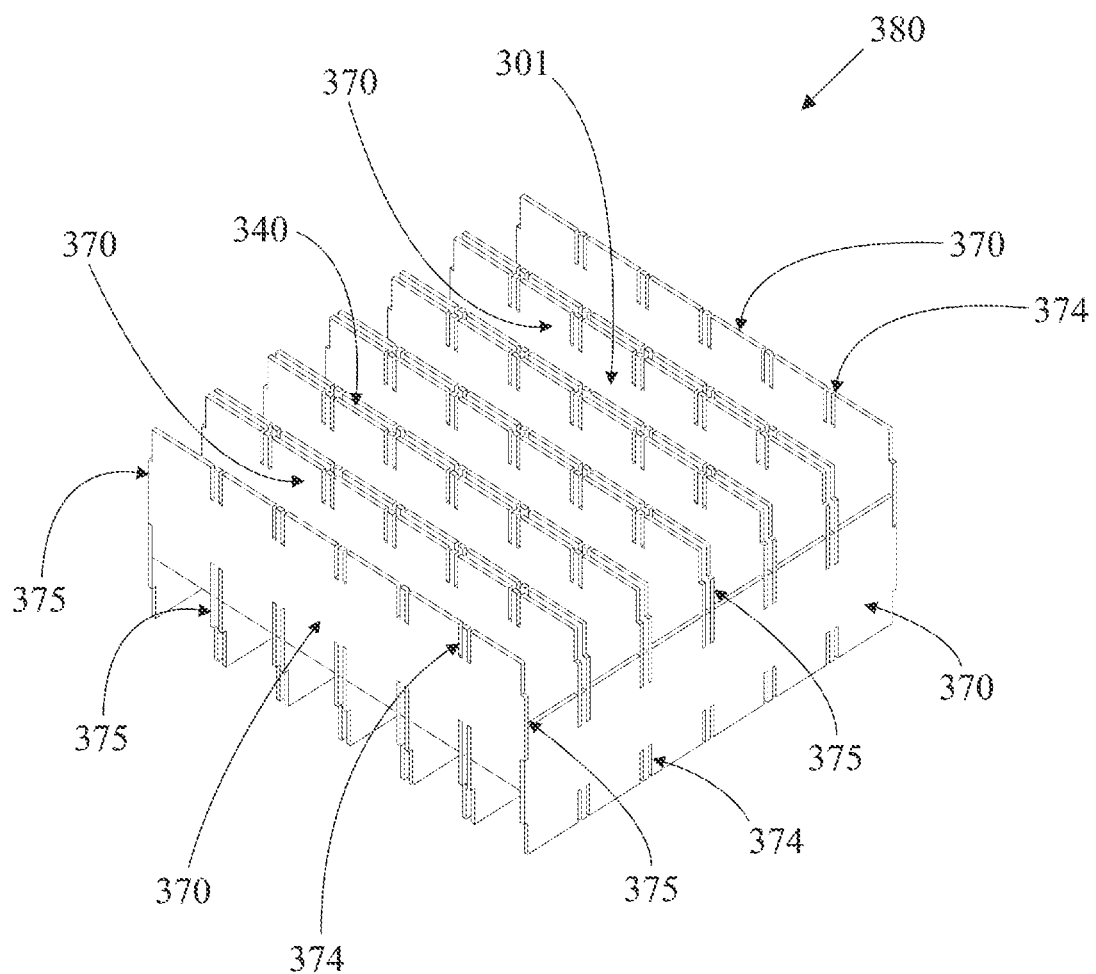
FIG. 12 is a perspective view of a vertical section of slotted plates of the fuel rack of FIG. 10.

Referring now to FIG. 12, a single middle segment 380 of the basket is illustrated. Each middle segment 380 of the fuel rack 300 comprises a gridwork of middle plates 370 arranged in a rectilinear configuration so as to form a vertical portion of the cells 301 and the flux traps 340. In creating a middle segment 380, a first middle plates 370 is arranged vertically. A second middle plate 370 is then arranged above and at a generally 90 degree angle to the first middle plate 370 so that its corresponding slots 374 are aligned. The second middle plate 370 is then lowered onto the first middle plate 370, thereby causing the slots 374 to interlock as illustrated. This is repeated with all middle plates 370 until the desired rectilinear configuration is created, thereby creating the segment 380.

In creating the fuel rack body, the slots 374 and end tabs 375 of the segments 380 interlock the adjacent segments 380 together so as to prohibit relative horizontal and rotational movement between the segments 380. The segments 380 intersect and interlock with one another to form a stacked assembly that is the fuel rack body. The fuel rack 300 preferably comprises at least four of the segments 380, and more preferably at least ten segments 380. All of the segments 380 have substantially the same height and configuration.

Therefore, the entire fuel rack 300 is formed of slotted plates 370-372 having what is essentially a single configuration which is the middle plate 370, with the exception that the top and bottom plates 371, 372 have to be formed by cutting the middle plate 370 and adding the cutouts 321.

Furthermore, as a result of the interlocking nature of the slotted plates 370-372, spacers are not needed to maintain the flux traps 340. Thus, in some embodiments, the fuel rack 300 will be free of spacers in the flux traps 340.

IV. Non-Flux Trap Fuel Basket Embodiment

Figure 13:
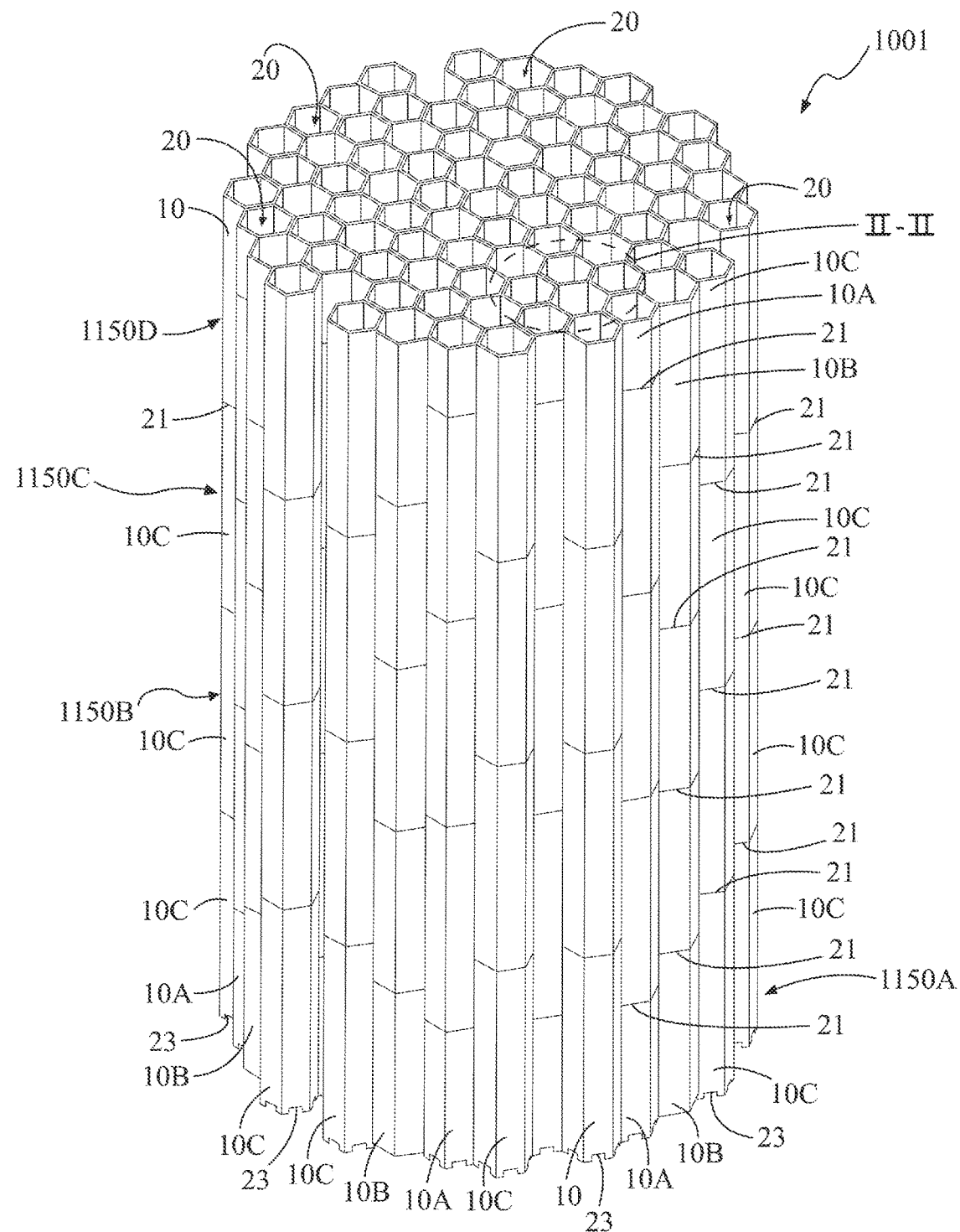
FIG. 13 is a top perspective view of a storage grid portion of a fuel basket according to an embodiment of the present invention.
Figure 14:
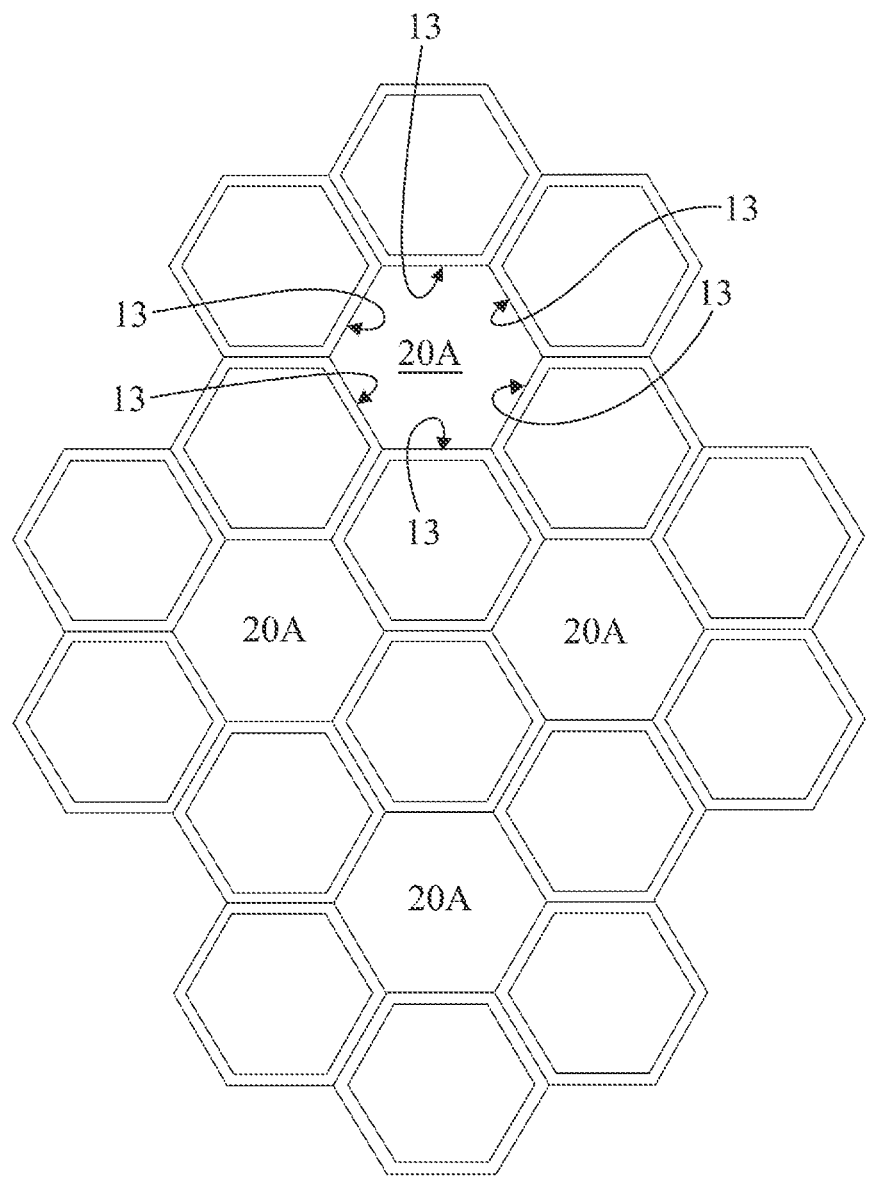
FIG. 14 is a top view of the area II-II of FIG. 13 illustrating a resultant cell according to one embodiment of the present invention.
Figure 15:
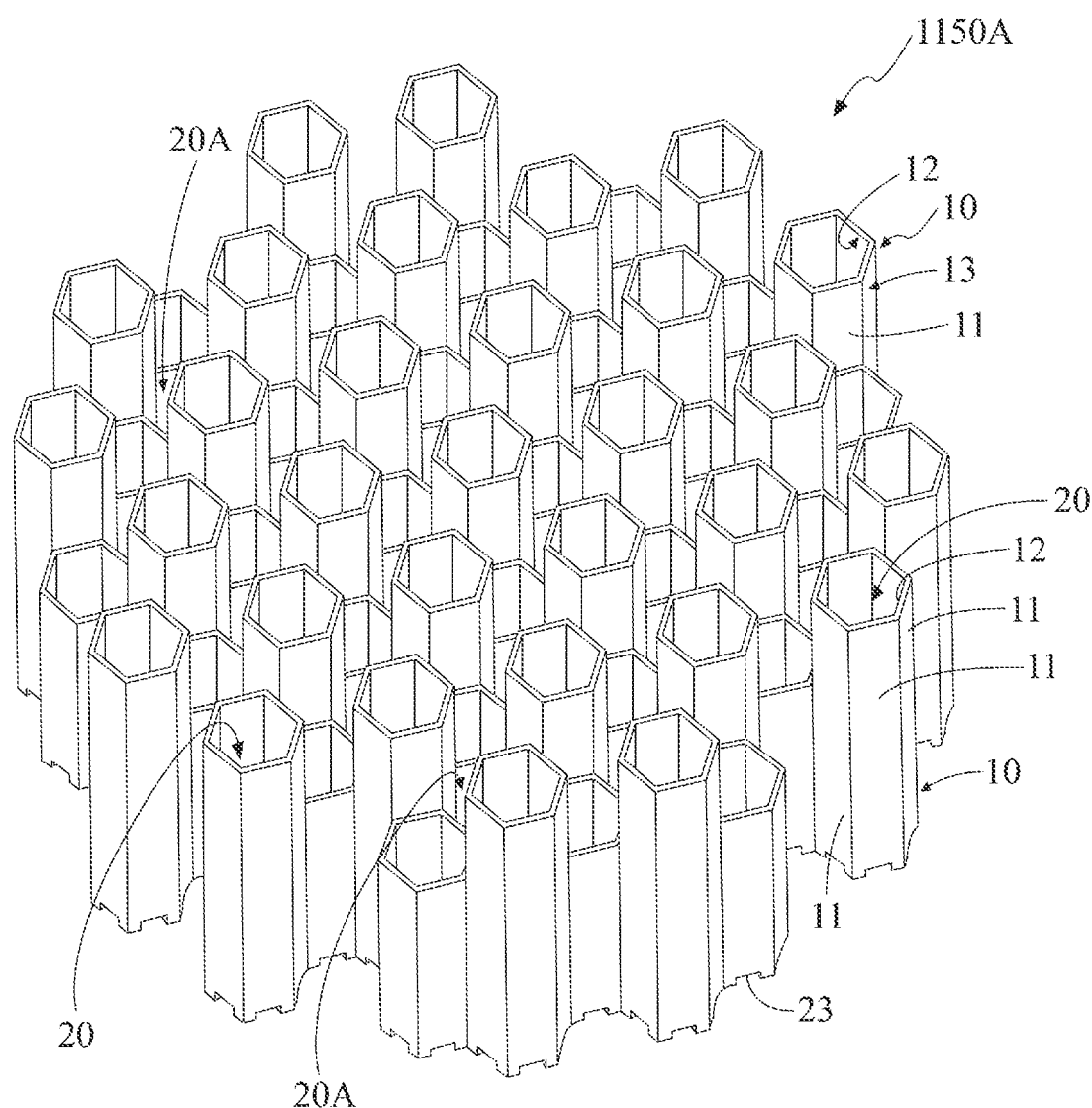
FIG. 15 is a perspective view of the bottom vertical segments of the storage tubes of the fuel basket of FIG. 13 arranged in the desired pattern so that interfaces between segments of adjacent storage tubes are not vertically aligned.
Figure 16:
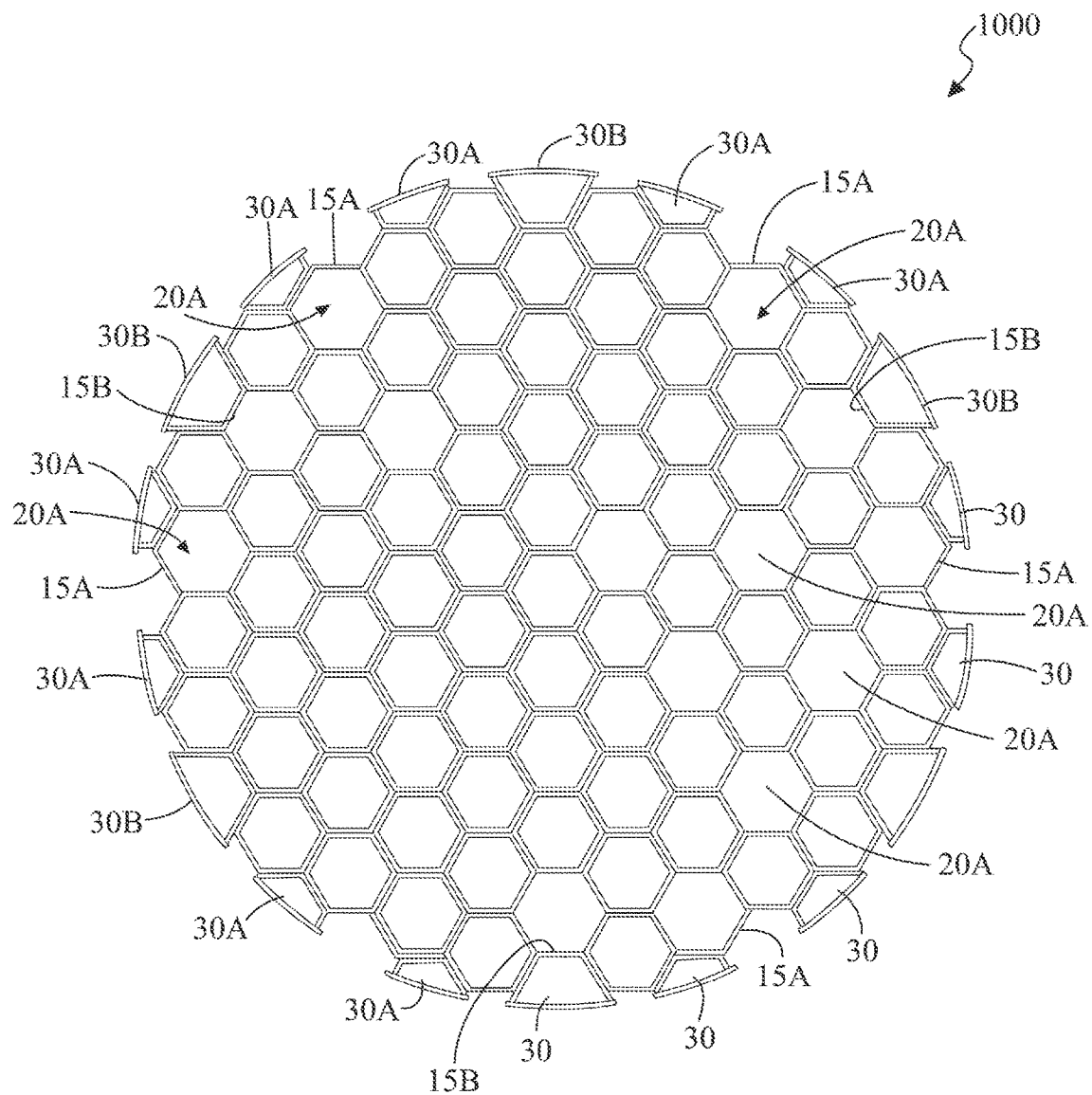
FIG. 16 is a top view of a fuel basket according to one embodiment of the present invention, comprising the storage grid portion of FIG. 13 and perimeter support tubes.
Figure 17:
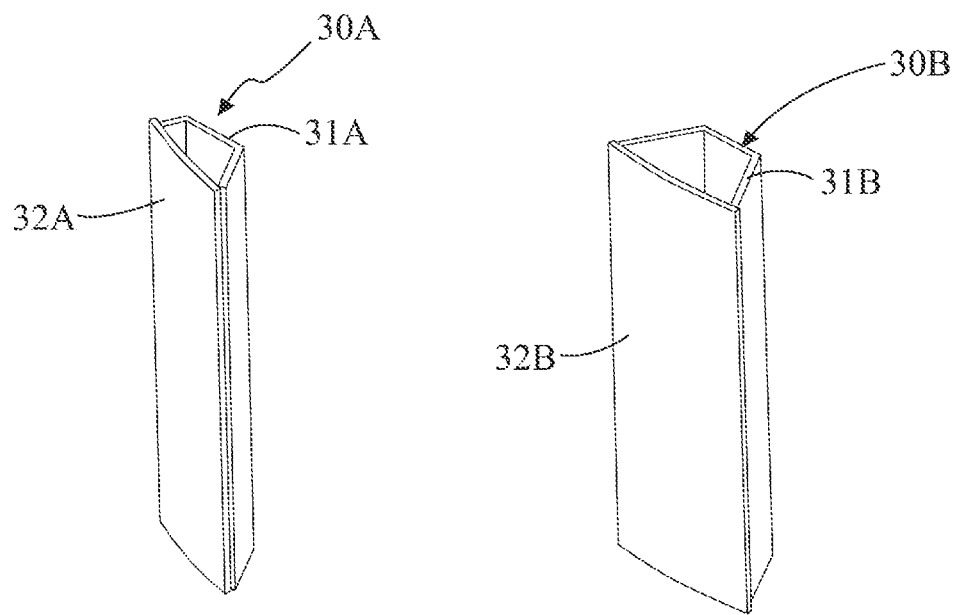
FIG. 17 is a perspective view of the supports tubes according to one embodiment of the present invention.

Referring to FIGS. 13-17, a fuel basket 1000 according an embodiment of the present invention is illustrated. The complete and assembled fuel basket 1000 is shown in FIGS. 15 and 17. While the fuel basket 1000 (and its components) are described throughout this specification in conjunction with storing and/or transporting spent nuclear fuel assemblies having a hexagonally shaped horizontal cross-sectional profile, the invention is in no way limited by the type of high level radioactive waste it is use din conjunction with. The fuel basket assembly 1000 (and its components) can be used to transport and/or store any shape of fuel assemblies.

Referring now to FIG. 13, a perspective view of the storage grid portion 1001 of the fuel basket 1000 is illustrated. The storage grid 1001 is a cellular structure comprising a plurality of tubes 10 forming cells 20 for receiving and holding fuel assemblies. The tubes 10 form a honeycomb-like grid of cells 20 arranged in a polar configuration. For ease of representation (and in order to void clutter), only a few of the tubes 10 and the cells 20 are numerically identified in FIG. 13.

The tubes 10 have a horizontal cross-sectional profile that is hexagonal in shape. The invention is not so limited however, and the tubes 10 will have a horizontal cross-sectional profile that corresponds with the shape of the fuel assembly to be stored within the cavities 20. For example, other polygonal-shaped SNF assemblies may be stored in the fuel basket 1000, in which case the tubes 10 will be of the appropriate horizontal cross-sectional shape. The cells 20 are substantially vertically oriented elongate spaces/cavities having a generally hexagonal horizontal cross-sectional configuration. The horizontal cross-sectional profile of the cells 20 is also not limited to hexagonal, and could be any shape including other polygons. Each cell 20 is designed to accommodate a single fuel assembly. The storage grid 1001 (and thus the cells 20) has a height that is equal to or slightly greater than the height of the fuel assembly for which the basket 1000 is designed to accommodate. The fuel basket 1000 preferably comprises 85 cells 20 and has a weight of approximately 4800 lbs.

Each storage tube 10 comprises five plates 11 having an inner surface 12 and an outer surface 13. The tubes 10 could have less or more plates 11 depending upon the desired horizontal cross-sectional profile. The inner surface 12 of the tubes 10 form the cells 20. Preferably, the tubes 10 are bundled together in an axially adjacent arrangement to form a honeycomb storage grid of cells 20. The tubes 10 are formed by staking tubular segments 10A-10C so as to create cells 20 having a height equal to, or greater than the height of the fuel assembly to be stored therein. An interface/junction 21 is formed between the contacting edges of the tubular segment 10A-10C in each vertical stack that forms the tube 10. For ease of representation (and in order to void clutter), only a few of the contact interfaces are numerically identified in FIG. 13. As will be discussed in further detail below, the tubular segments 10A-10C are of varying height so that the interfaces 21 of adjacent tubes 10/cells 20 are not aligned. By ensuring that the interfaces 21 are not aligned for adjacent tubes 10/cells 20, the structural integrity of the fuel basket 1000 is enhanced.

Preferably, the tubes 10 (and tubular segments 10A-10C) are made by extruding or forming plate stock followed by welding each of the plates 11 at their lateral edges. The tubes 10 are made of a material containing a neutron absorber isotope embedded in the microstructure, such as elemental boron or boron carbide. Metamic, produced by Metamic, LLC, made of an aluminum alloy matrix with embedded boron carbide is an example of an acceptable material. In some embodiments, however, the fuel basket 1000 and its components can be constructed of alternate materials, such as steel or borated stainless steel.

A plurality of cutouts 23 are provided in the plates 11 at the bottom of the tubes 10. For ease of representation (and in order to void clutter), only a few of the cut-outs 23 are numerically identified in FIG. 13. The cutouts 23 form passageways through the plates 11 so that all of the cells 20 are in spatial communication. As a result, the cutouts 23 at or near the bottom of the storage grid 1001 act as a bottom plenum that helps circulate fluids (air or water) within the fuel basket 1000 (and the cells 20) to effectuate convective cooling of the stored fuel assemblies during storage and/or transportation. This natural circulation of air or water can be further facilitated by leaving one or more of the cells 20 along the periphery of the basket 100 empty so that they can act as downcomers (the support tubes 30A, 30B can also act as downcomers if the cutouts are added). The cutouts 23 are rectangular in shape in the illustrated embodiment but can take on a wide variety of shapes.

Referring to FIGS. 13 and 15 concurrently, the storage grid 1001 is formed by a plurality of sections 150A-D of the tubular segments 10A-10C that are arranged in a stacked assembly. The sections 150A-D and the tubular segments 10A-C are joined with one another to form the stacked assembly that is the storage grid 1001. Each section 150A-D of the storage grid 1001 is a vertical portion of the storage grid 1001 that itself comprises the honeycomb-like grid of tubular segments 10A-C arranged in the polar configuration. The tubular segments 10A-C are of three different heights, each different height delineated by the letter A-C. A single bottom section 150A of the storage grid 1001 is illustrated in FIG. 15, the bottom section 150A having tubular segments 10A-C arranged in a polar configuration. The bottom edges of the tubular segments 10A-C are aligned at the same elevation. The two middle sections 150B-C comprise tubular members 10C, all having the same height. The top section 150D comprises tubular members 10A-C arranged so that the top surfaces of the tubular members 10A-C are aligned at the same elevation.

The tubular segments 10A have a height that is preferably equal to one foot. The tubular segments 10B have a height that is preferably equal to two feet. The tubular segments 10C have a height that is preferably equal to three feet. The invention is not so limited however, and the tubular segments 10A-C may be of any height so long as the cells formed are at least equal to the height of the fuel assembly. In order to ensure that the interfaces 21 of adjacent tubes 10 are not aligned, it is preferable that no adjacent tubular members 10A-C of the bottom section 150A be of the same height. Thus when assembling the bottom section 150A, the one foot tubular segment 10A is surrounded by alternating tubular members 10B and 10C.

Referring now to FIGS. 14 and 16, the fuel basket 1000 further comprises a plurality of resultant cells 20A that are formed by the outer surface 13 of the walls 11 of six of the tubular members 10. A single resultant cell 20A is illustrated in FIG. 14. Where six tubular members are joined in a polar configuration, a resultant cell 20A having a hexagonal horizontal cross-sectional profile is formed therebetween. This arrangement allows for less plates 11 (i.e., tubes 10) to be used to create the same number of cells 20, thereby creating a lighter fuel basket 1000. In the illustrated embodiment there are a total of twenty-nine resultant cells 20A. The invention is not so limited however, and the number of resultant cells may vary. The resultant cells 20A have about a ½ inch larger opening and thus can accommodate fuel assemblies that are damaged or dimensionally-deviant. Additionally, the resultant cells 20A allow for the fuel basket 1000 to be fabricated using fillet welds because the resultant cells provide easier access to the tubes 10.

As best seen in FIG. 16, some resultant cells 20A that are located along the periphery of the fuel basket 1000 require the use of a closure plate 15A-B to complete the cell. The closure plates 15A-B are par-hexagonal plates. The fuel basket assembly 1000 comprises two types of closure plates 15A-B depending on the configuration of the resultant cell 20A. Some resultant cells 20A require only a single panel to enclose the cell 20A, while other resultant cells require two panels to enclose the resultant cell 20A. Where two panels are required, a closure plate 15A is formed by bending a plate into two panels of equal length and attaching the lateral edges of the closure plate 15A to the lateral edges of the tubes 10 that are forming the applicable resultant cell 20A.

The basket assembly 1000 further comprises basket support tubes 30A, B placed adjacent the storage grid 1001 along its periphery. The basket support tubes 30A,B are used to provide conformal contact with the container/vessel in which the basket assembly 100 is to be used. The basket support tubes 30A, B comprise a par-hexagonal plate 31A, B connected to the concave side of a curved plate 32A, B. The curved plates 32A, 32B form a substantially circular outer perimeter for the fuel basket 1000. Because the basket support tubes 30A,B are not located at every position on the periphery of the storage grid, the substantially circular outer perimeter is circumferentially segmented.

For resultant cells 20A that require only a single panel to form a six-walled cell (i.e., one side is open), the par-hexagonal plate 31B of the support tubes 30B can also function as a closure plate. The basket support tubes 30A can be used where there is no resultant cell 20A, or where the resultant cell 20A is enclosed by the closure plate 15A.

Referring now to FIG. 17, the basket support tubes 30A, B are shown removed from the fuel basket assembly 1000. The basket support tubes 30A,B are provided so that the basket assembly is centered within the container (which can be a canister or a cask) in which it is to be used.

Figure 18:
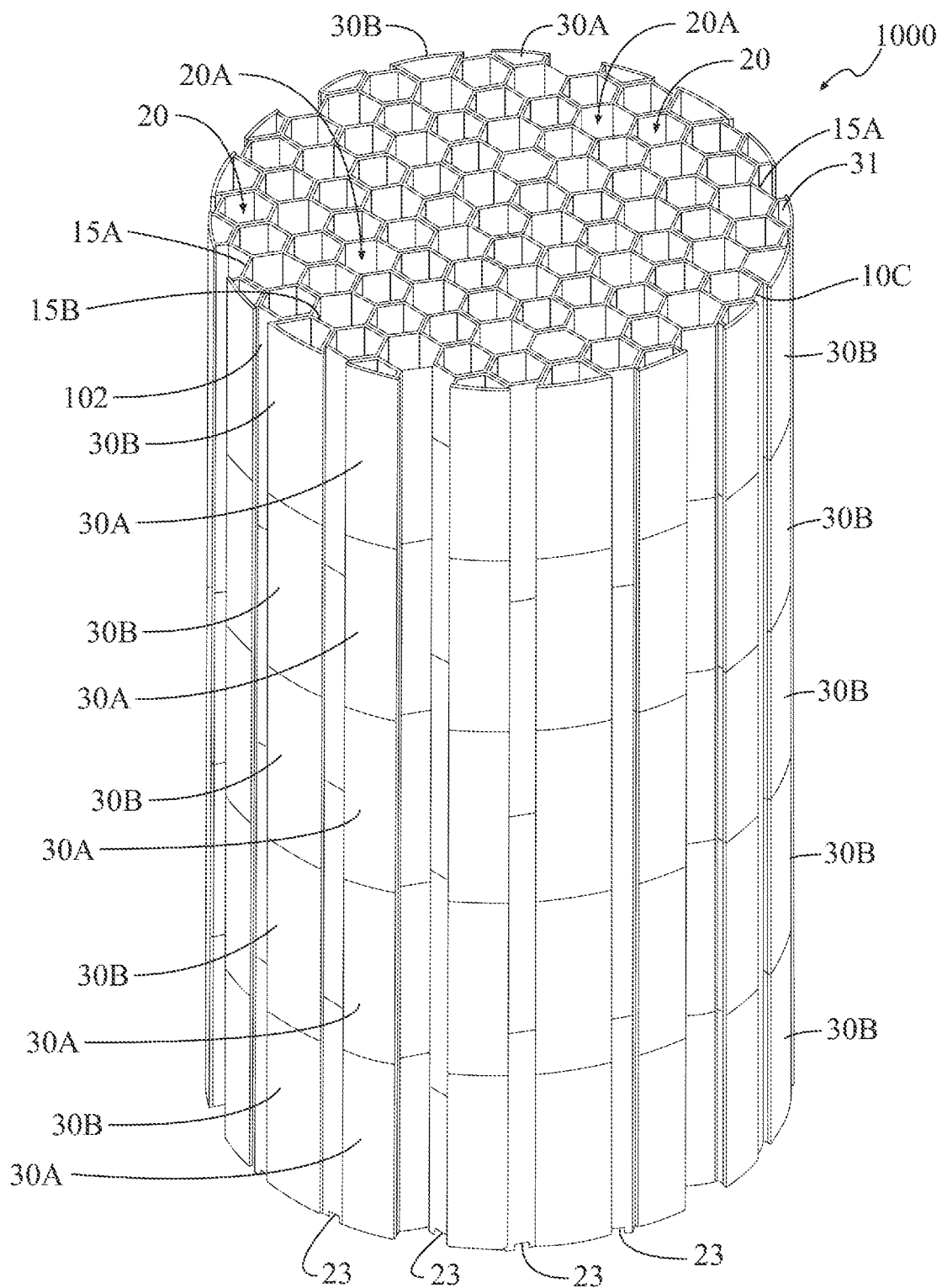
FIG. 18 is a perspective view of the fuel basket of FIG. 16.

Referring now to FIG. 18, the basket assembly 100 with the basket supports 30A, B attached is illustrated. The basket supports 30A, B provide for a circular outer perimeter of the fuel basket 1000. The gaps 31 in the basket supports 30A,B do not have fuel assemblies stored therein, thus they may improve the cooling of the fuel assemblies stored in the cells 20.

V. Flux Trap Fuel Basket Embodiment

Figure 19:
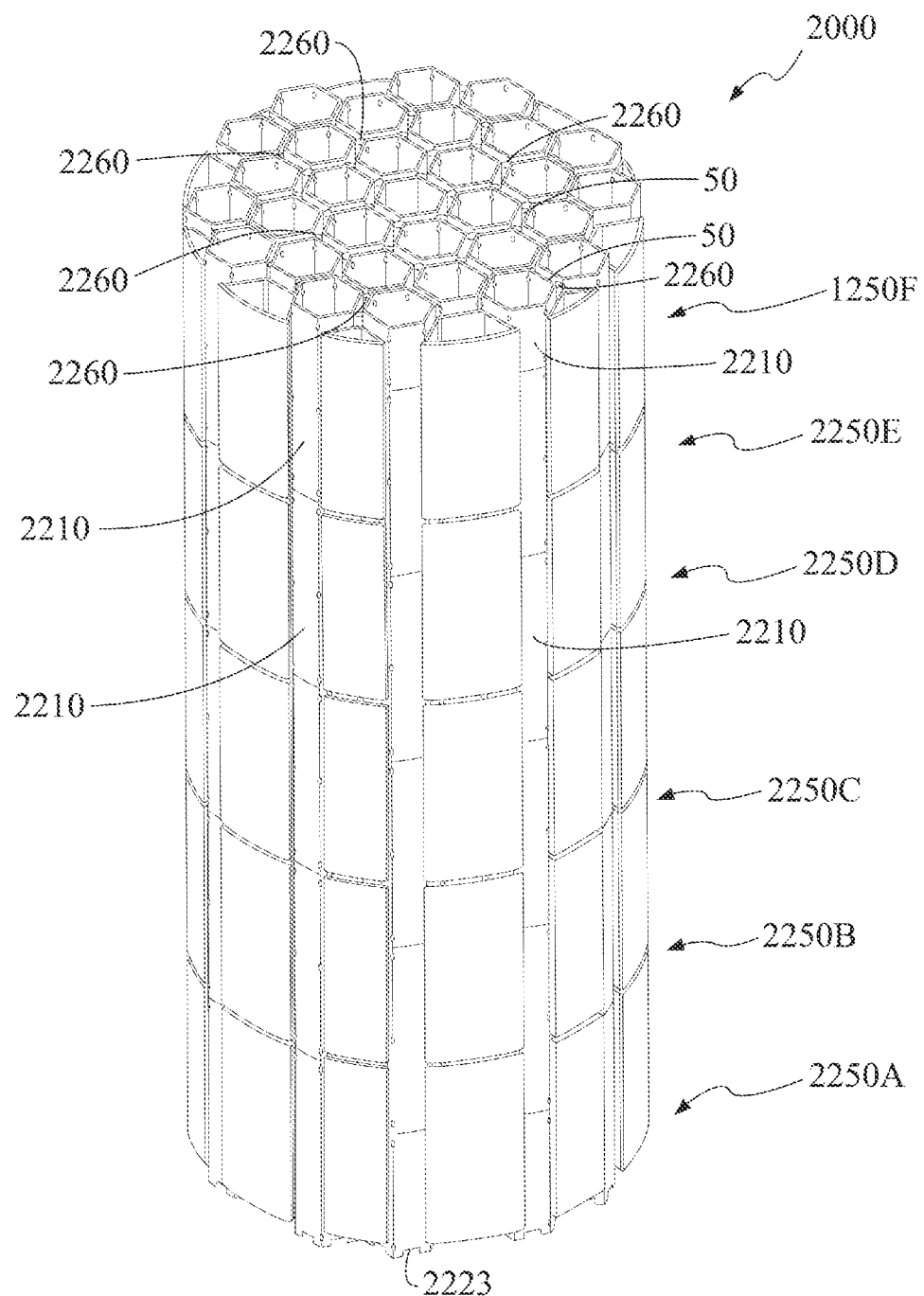
FIG. 19 is a perspective view of a fuel basket assembly according to a second embodiment of the present invention.

Referring now to FIG. 19, a fuel basket 2000 according to another embodiment of the present invention is illustrated. The design aspects of the fuel assembly 2000 are substantially similar to those discussed above with respect to the fuel basket 1000. To avoid redundancy, only those design aspects of the fuel basket 2000 that substantially differ from the fuel basket 1000 will be discussed.

The basket assembly 2000 comprises a plurality of flux trap spaces 50 that regulate the production of neutron radiation and prevent reactivity in a flooded condition. The flux traps 50 are small spaces that extend the height of the basket 2000. The flux traps 50 are formed between two of the tubular members 210 that are close to one another and substantially parallel. As will be discussed below, the flux traps 50 are designed to be of variable width to maximize the number of fuel assemblies that can be stored in the fuel basket 2000 while maintaining a reactivity equal to or less than 0.95. The flux traps 50 are formed between the outer surface of the storage tubes 2210. The tubes 2210 have a plurality of spacers 60 that maintain the spacing between tubular members 10 that forms the flux trap 50.

Figure 20:
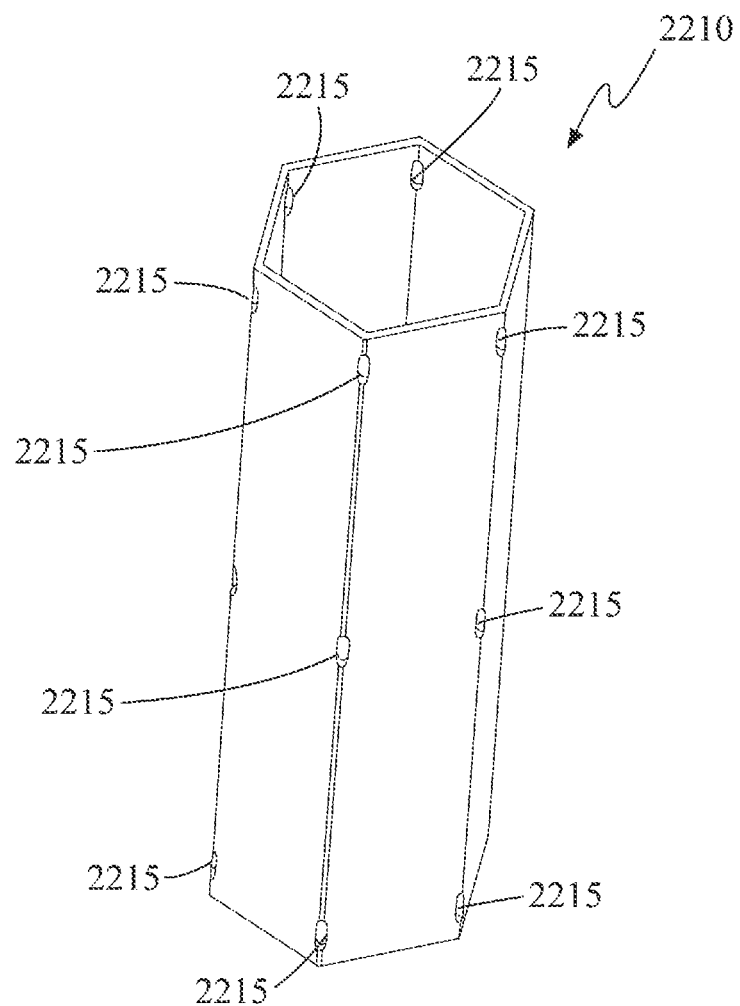
FIG. 20 is a perspective view of a storage tube of the fuel basket of FIG. 19.
Figure 24:
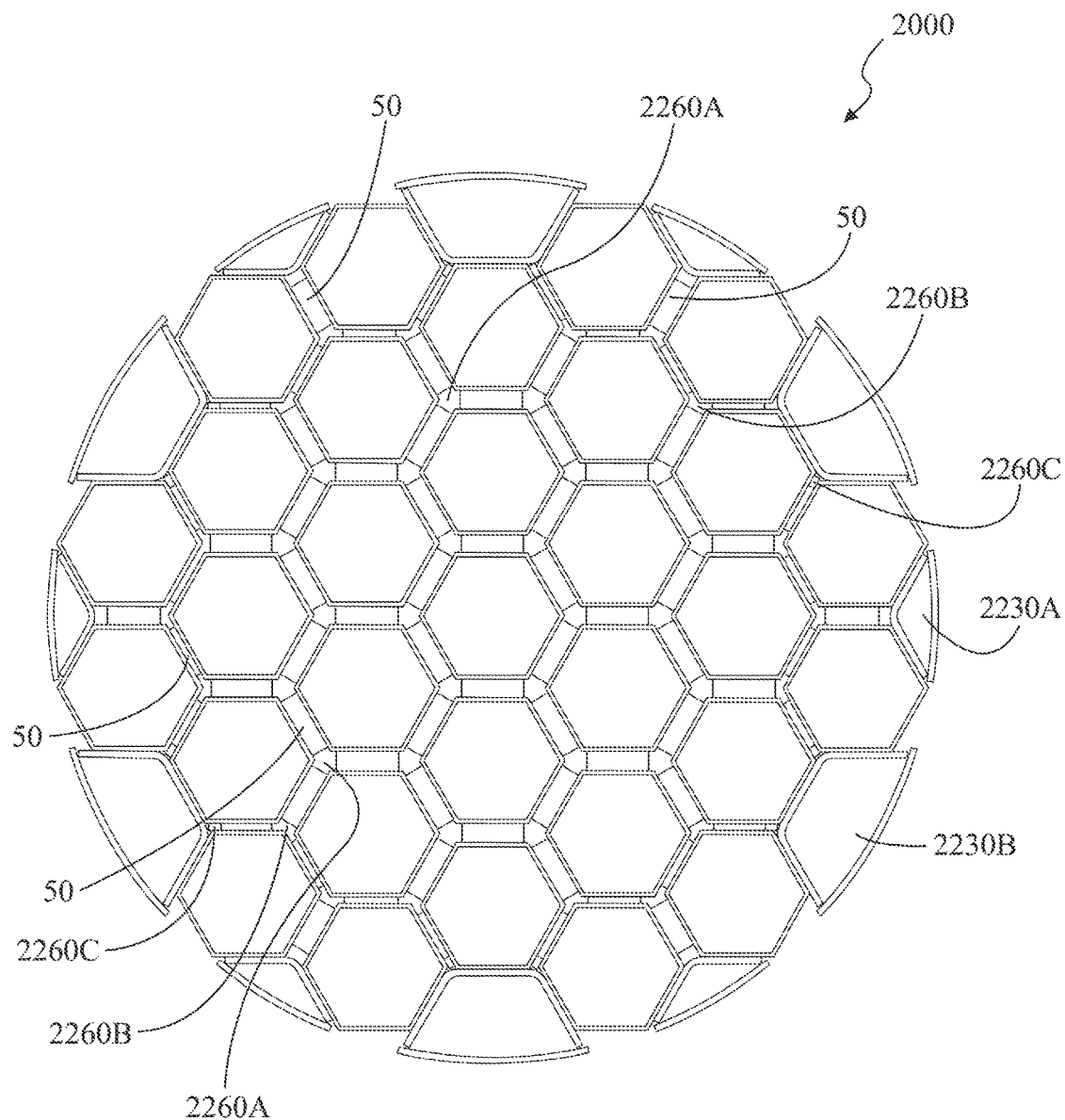
FIG. 24 is a top view of the fuel basket of FIG. 19.

Referring now to FIG. 20, a single storage tube 2210 is shown removed from the fuel basket 2000 so that it's design aspects can be more clearly visible. The storage tube 2210 has a hexagonal horizontal cross-sectional profile but can be any configuration. Preferably, the cross-sectional profile will be determined by the type of fuel assembly to be loaded and stored in the fuel basket assembly 2000. The tube 2210 comprises a plurality of notches 2215. The notches 2215 provide spaces through which the spacer 2260 (shown in FIG. 24) can be attached. Preferably, the spacers 60 are initially tack welded to the tubes 2210 so that the fuel basket 2000 can be assembled. After the fuel basket 2000 is assembled it is placed on its side and the spacers 2260 that are on the bottom (closer to the ground surface on which the basket assembly 2000 is resting) are plug welded to the storage tubes 2210. This allows for gravity to aid in the welding procedure. The fuel basket 2000 is rotated so that the next set of spacers 2260 is now closer to the ground surface for welding to the tubes 2210. The rotating and welding procedure is repeated for all of the spacers 2260 and tubes 2210.

Figure 21:
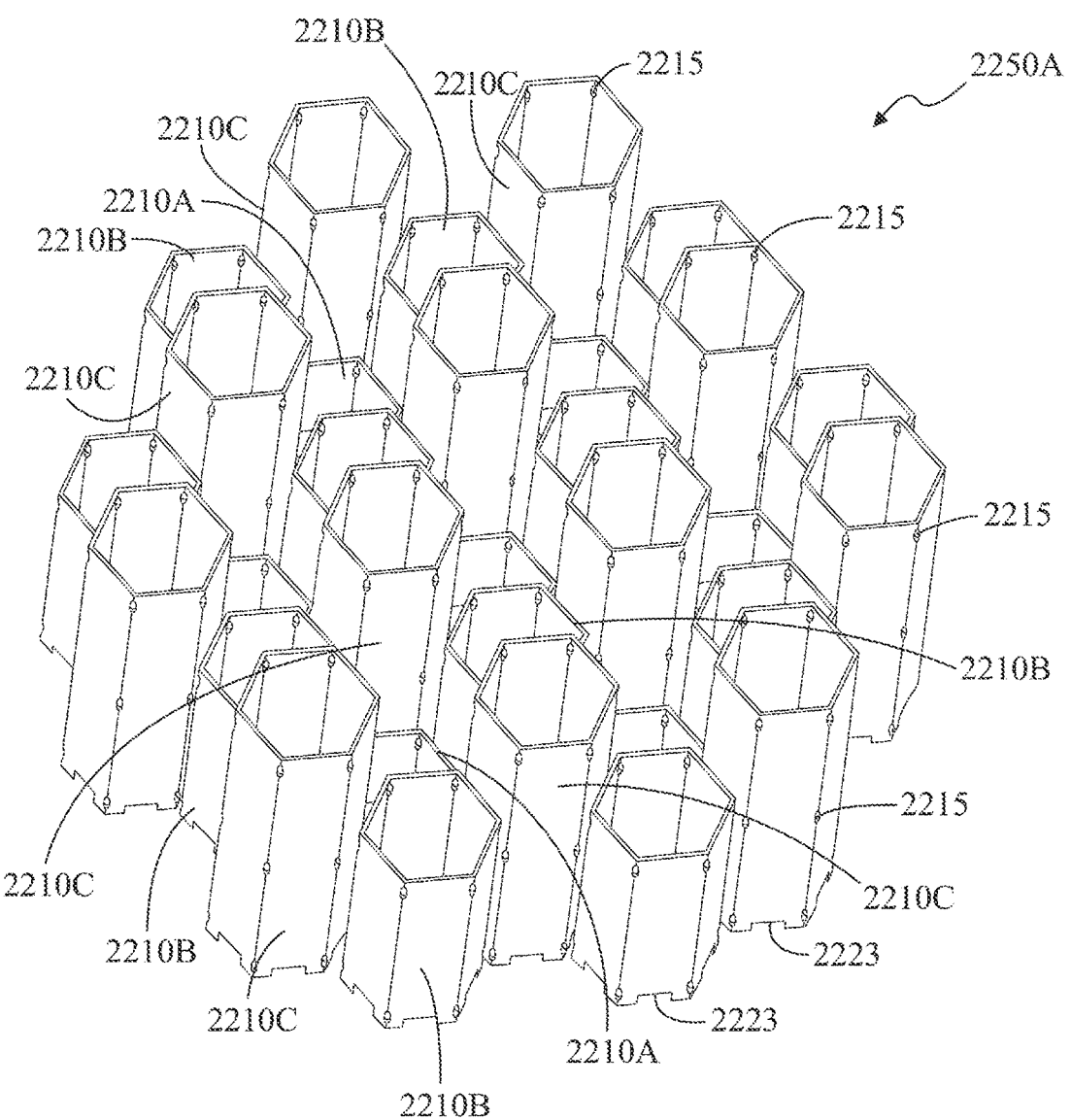
FIG. 21 is a perspective view of the bottom vertical segment of the storage grid portion of the fuel basket of FIG. 19.
Figure 22:
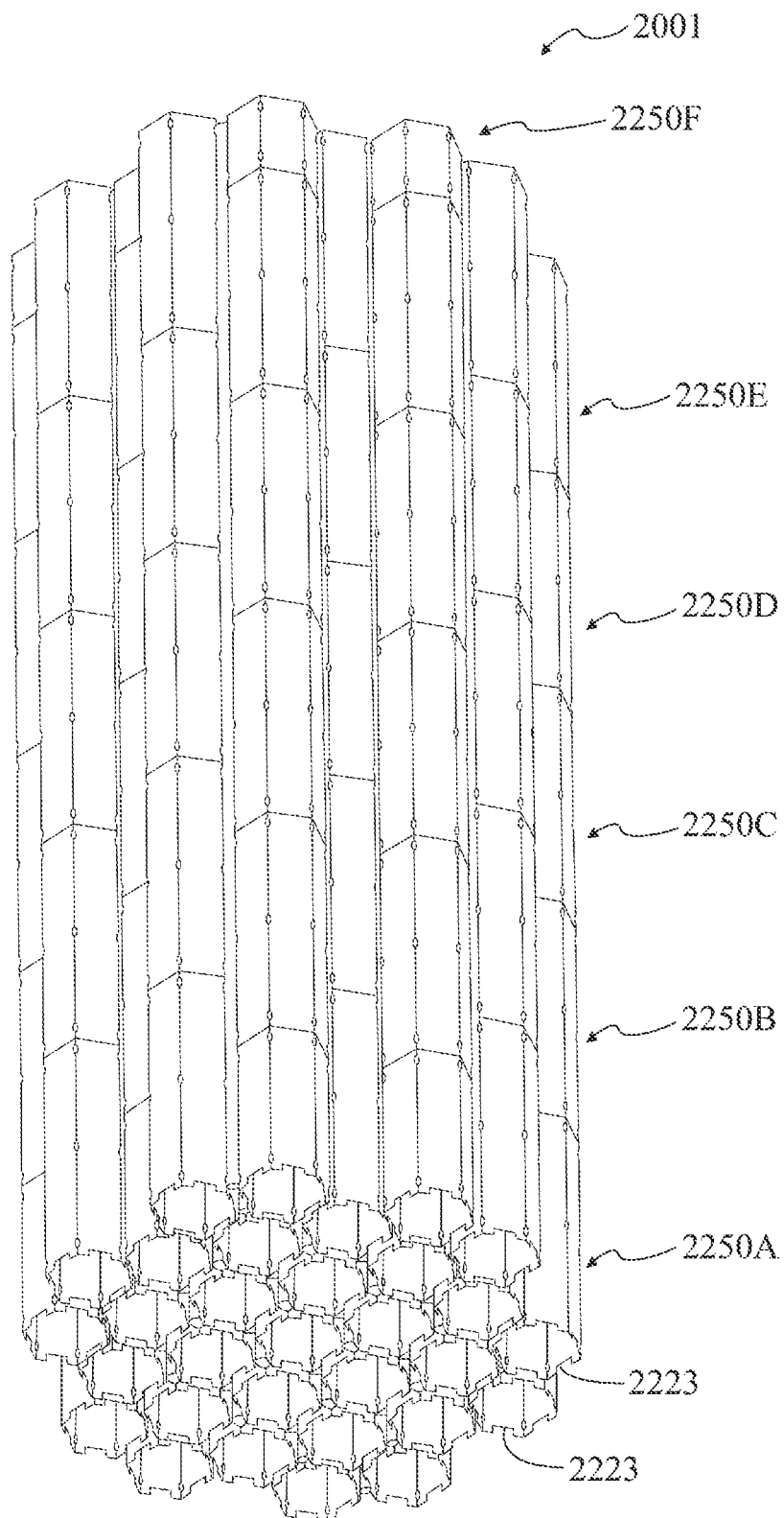
FIG. 22 is a bottom perspective view of the storage grid portion of the fuel basket of FIG. 19.

Referring to FIGS. 21 and 22 concurrently, the fuel basket 2000 is formed by a plurality of sections 2250A-F of the tubular segments 2210A-C that are arranged in a stacked assembly. The sections 2250A-F and the tubular segments 2210A-C are joined with one another to form the stacked assembly that is the fuel basket 2000. Each section 2250A-F of the fuel basket 2000 comprises a honeycomb-like grid of tubular segments 2210A-C arranged in the polar configuration. The tubular members 2210A-C of the basket assembly 2000 are of three varying heights, each height delineated by the letter A-C. A single bottom section 2250A of the basket 2000 is illustrated in FIG. 21, the bottom section 2250A has tubular segments 2210A-C arranged in a polar configuration. The middle sections 2250B-E comprise tubular segments 2210C, all having the same height. The top section 2250F comprises tubular segments 210A arranged so that the top surfaces of the tubular segments 2210A-C are aligned at the same elevation.

The storage tubes 2210A have a height that is preferably equal to one foot. The tubular segments 2210B have a height that is preferably equal to two feet. The tubular segments 2210C have a height that is preferably equal to three feet. The invention is not so limited however, and the tubular segments 2210A-C may be of any height so long as the cells formed are at least equal to the height of the fuel assembly. In order that the interfaces 2221 are not aligned, it is preferable that no adjacent tubular segments 2210A-C of the bottom section 2250A be of the same height. Thus when assembling the bottom section 2250A, the one foot tubular segments 2210A are surrounded by alternating tubular segments 2210B and 2210C. The bottom edges of the tubular segments 2210A-C of the bottom section 2250A are aligned.

Figure 23:
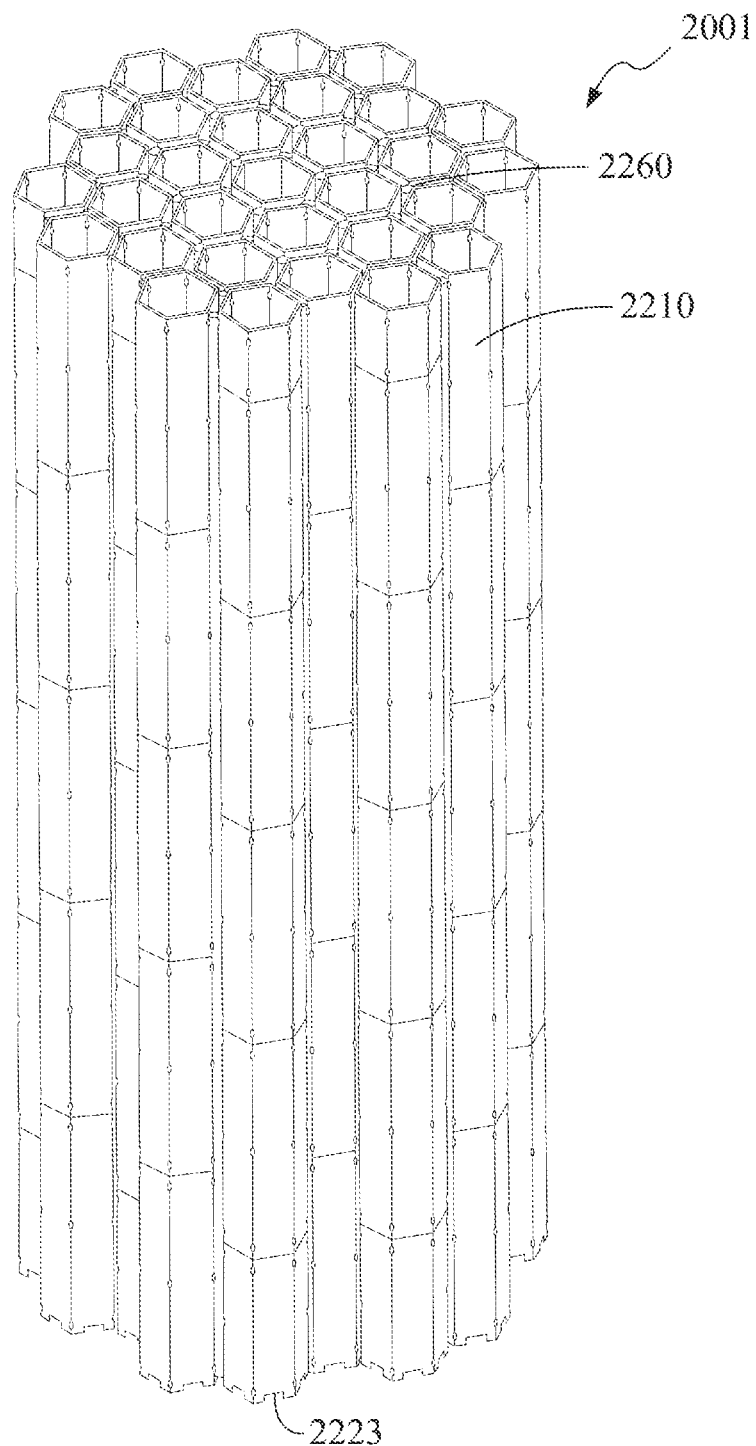
FIG. 23 is a top perspective view of the storage grid portion of the fuel basket of FIG. 19.

Referring now to FIG. 23, a top perspective view of the fuel basket assembly 2000 is illustrated. The basket assembly 2000 comprises three types of spacers 2260A-C that form flux traps 50 between the tubes 2210. The first type of spacer 2260A is a unilateral triangle that maintains the largest gap between the tubes 2210 located near the central axis of the basket 2000. In other words, the spacer 2260A is used with the tubes 2210 that are closest to the center of the basket 2000 because the neutrons emitted by the fuel assemblies in the center of the basket 2000 cannot easily escape to the perimeter of the basket assembly 2000. Thus, for maintaining a reactivity of less than 0.95, a larger flux trap 50 is required. A second shape of spacer 2260B is used between the storage tubes 2210 that are nearer the outer perimeter of the fuel basket 2000. A rectangular spacer 2260C is used for the storage tubes 2210 that are nearest to the outer perimeter formed by basket supports 2230A,B.

The fuel baskets 1000, 2000 of the present invention are not limited to use with any particular type of surrounding vessels. For example, in one embodiment, the basket assemblies 1000, 2000 can be incorporated into a hermetically sealable multi-purpose canister for use in conjunction with VVO style containment systems. In such an embodiment, the basket assemblies 1000, 2000 will be provided in a cavity formed by a cylindrical metal shell. The metal shell will encircle the basket assembly 1000, 2000 and a metal base plate may be welded to the bottom of the metal shell. A metal closure plate can be fitted on top of the cylinder formed by the metal shell, thereby forming a canister. Thermally conductive casks can also be used to house the fuel baskets 1000, 2000 directly.

While the invention has been described and illustrated in sufficient detail that those skilled in this art can readily make and use it, various alternatives, modifications, and improvements should become readily apparent without departing from the spirit and scope of the invention.

What is claimed is:

1. A fuel basket for supporting radioactive fuel assemblies comprising:
    a grid of cells for housing radioactive fuel assemblies, the grid formed by a plurality of polygonal tubes having an outer surface and an inner surface that forms one of the cells, the plurality of polygonal tubes arranged in an adjacent manner and in a pattern so that one or more of the cells is a resultant cell formed by the outside surfaces of surrounding polygonal tubes;
    a plurality of par-polygonal plates; and
    the plurality of par-polygonal plates arranged adjacent and welded to the polygonal tubes along a periphery of the grid so as to complete any resultant cells having one or more open sides;
    wherein the polygonal tubes and resultant cells have the same configuration dimensioned to geometrically accommodate a hexagonal fuel assembly;
    wherein the polygonal tubes each comprise a plurality of vertically stacked tube segments arranged in axial alignment forming a plurality of interfaces between the tube segments;
    wherein the polygonal tubes are welded to adjacent polygonal tubes to form the grid of cells.

2. The apparatus of claim 1 wherein every third one of the cells is a resultant cell formed by the outside surfaces of surrounding polygonal tubes.

3. The apparatus of claim 1 further comprising:
    a base plate having a top surface; and
    the grid of cells connected to the top surface of the base plate so that the polygonal tubes are in a substantially vertical orientation.

4. The apparatus of claim 1 wherein the base plate comprises a plurality of holes that form passageways from below the base plate to the cells, and wherein the polygonal tubes comprise one or more cutouts at or near the base plate.

5. The apparatus of claim 1 wherein the polygonal tubes are constructed of a boron impregnated aluminum material.

6. A fuel rack having perimeter cells and non-perimeter cells for supporting fuel assemblies comprising:
   a base plate having a top surface;
   a plurality of polygonal tubes dimensioned for holding a fuel assembly, each polygonal tube having inner surfaces that form one of the perimeter cells or the non-perimeter cells; and
   the polygonal tubes connected to the top surface of the base plate in a substantially vertical orientation and in a pattern so that a plurality of resultant cells are formed by adjoining outside surfaces of surrounding polygonal tubes;
   wherein the polygonal tubes and resultant cells have the same configuration dimensioned to geometrically accommodate a single fuel assembly;
   wherein the polygonal tubes each comprise a plurality of vertically stacked tube segments arranged in axial alignment forming a plurality of interfaces between the tube segments;
   wherein the tube segments are arranged such that none of the interfaces of adjacent tubes are aligned with one another;
   wherein the polygonal tubes are welded to adjacent polygonal tubes to form a grid of cells.

7. The fuel rack of claim 6 wherein no flux trap spaces exist.

8. The fuel rack of claim 6 wherein the base plate comprises a plurality of holes that form passageways from below the base plate to the non-perimeter and perimeter cells.

9. The fuel rack of claim 6 wherein the polygonal tubes comprise one or more cutouts at or near the base plate.

10. The fuel rack of claim 6 wherein the base plate is constructed of aluminum.

11. The fuel rack of claim 6 wherein the polygonal tubes are constructed of a boron impregnated aluminum material.

* * * * *